(12) United States Patent
Elhag et al.

(10) Patent No.: US 8,539,542 B1
(45) Date of Patent: Sep. 17, 2013

(54) SYSTEM AND METHOD FOR MANAGING MULTIPLE LIVE VIDEO BROADCASTS VIA A PUBLIC DATA NETWORK ON A SINGLE VIEWING CHANNEL

(75) Inventors: Sam Elhag, San Diego, CA (US); Kevin E. Kalajan, Nevada City, CA (US)

(73) Assignee: WHDC LLC, Nipomo, CA (US)

( * ) Notice: Subject to any disclaimer, the term of this patent is extended or adjusted under 35 U.S.C. 154(b) by 600 days.

(21) Appl. No.: 12/583,707

(22) Filed: Aug. 25, 2009

(51) Int. Cl.
*H04N 7/16* (2011.01)

(52) U.S. Cl.
USPC ........... 725/135; 725/105; 725/114; 725/118; 725/120; 725/138; 725/139; 725/140; 725/143; 725/144

(58) Field of Classification Search
USPC ............. 725/74, 82, 85, 86, 87, 914, 94, 100, 725/101, 103, 135, 138, 139, 141, 91, 105, 725/109, 110, 114, 115, 116, 117, 118, 119, 725/120, 121–123, 133, 143, 153
See application file for complete search history.

(56) References Cited

U.S. PATENT DOCUMENTS

| | | | | |
|---|---|---|---|---|
| 7,475,418 | B2 * | 1/2009 | Ikeda et al. | 725/70 |
| 2004/0261127 | A1 * | 12/2004 | Freeman et al. | 725/135 |
| 2007/0079353 | A1 * | 4/2007 | Boortz | 725/135 |
| 2008/0016198 | A1 * | 1/2008 | Johnston-Watt et al. | 709/223 |
| 2008/0313679 | A1 * | 12/2008 | Ryden et al. | 725/87 |

* cited by examiner

*Primary Examiner* — Pankaj Kumar
*Assistant Examiner* — Alazar Tilahun

(57) ABSTRACT

A system and method for managing multiple live video broadcasts via a public data network on a single viewing channel is disclosed. An example embodiment includes receiving requests from a plurality of broadcasters wishing to broadcast at the same time on a channel of a public data network; queuing and prioritizing the requests in a broadcast queue; broadcasting content corresponding to a request of a first broadcaster on the channel; notifying a second broadcaster corresponding to one of a plurality of pending requests in the broadcast queue that the second broadcaster's opportunity for broadcast on the channel is imminent; discontinuing the broadcast of the content of the first broadcaster based on multiple factors; broadcasting content corresponding to a request of the second broadcaster on the channel; and using a coordinated real-time rendezvous to enable an audience of the channel to automatically transition from receiving the broadcast of the content of the first broadcaster to receiving the broadcast of the content of the second broadcaster on the same channel over the public data network.

23 Claims, 19 Drawing Sheets

High-level Components

High-level Components

High-level SSM Components

Note: Not every functional connection is depicted.

Queue Notifier

Signup

Queue Insertion

Broadcast Queue Display

Prepare to Broadcast

Dual mode or Single mode Client Operation

Publisher Mediation

When Broadcaster 1 is live:

Audience Member
CSPL
-1130-
Rendezvous:
http://a.b.c.d/videos/livestream1

When Broadcaster 2 is live:

Audience Member
CSPL
-1130-
Rendezvous:
http://a.b.c.d/videos/livestream2

Internet/Network
-1100-

Rendezvous = "livestream1" for Broadcaster 1

Rendezvous = "livestream2" for Broadcaster 2

Media Server (MS)
-1110- http://a.b.c.d/videos/livestream1
http://ab.c.d/videos/livestream2

Broadcaster 1
CSPU
-1150-
Rendezvous:
http://a.b.c.d/videos/livestream1

Broadcaster 2
CSPU
-1160-
Rendezvous:
http://a.b.c.d/videos/livestream2

Figure 11
Audience Mediation

Hacker Detection for Publisher Mediation

The Expiration Manager

Audience Statistics

Audience Feedback Mechanisms

Session Termination

Bandwidth Consumption Check

US 8,539,542 B1

SYSTEM AND METHOD FOR MANAGING MULTIPLE LIVE VIDEO BROADCASTS VIA A PUBLIC DATA NETWORK ON A SINGLE VIEWING CHANNEL

COPYRIGHT

A portion of the disclosure of this patent document contains material that is subject to copyright protection. The copyright owner has no objection to the facsimile reproduction of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2009, Kevin E. Kalajan, Sam Elhag, and WHDC LLC. All Rights Reserved.

BACKGROUND

1. Technical Field

This disclosure relates to networked systems. Embodiments relate to the field of Internet-based streaming video and Internet-based live streaming of user-generated content.

2. Related Art

Many websites exist that relate to user-generated video content. YouTube.com is the most notable example of pre-rendered video files that are available for viewing by the Internet community at-large. As well, YouTube has introduced a "live" streaming channel where they hand-select well-known YouTube content generators and give them a live context in which to broadcast. The broadcast emanates from the YouTube studios and is managed and controlled by YouTube staff. The audience has no control over the broadcasters, and broadcasters are pre-decided by YouTube staff and given specific timeslots.

Other "live" streaming sites include Justin.tv, Ustream.tv, and Blogtv.com. These sites specialize in enabling an average Internet user with a webcam to broadcast to their user community. For example, Ustream.tv has over 1.5 million individual broadcasting accounts (at the time of this writing). It is up to the individual broadcaster to augment their audience size. Individual broadcasters do not contend for a single broadcasting resource nor have any interaction with each other. Audience interaction is limited to a real-time text chat interface among other minor features (e.g., co-resident video of an audience member resulting in a pseudo group video chat experience).

Other analogous services to individual broadcast channels exist in the adult content area and have similar features.

BRIEF DESCRIPTION OF THE DRAWINGS

The various embodiments are illustrated by way of example, and not by way of limitation, in the figures of the accompanying drawings in which:

FIG. 11 illustrates Audience Mediation in an example embodiment;

DETAILED DESCRIPTION

Figure 1:
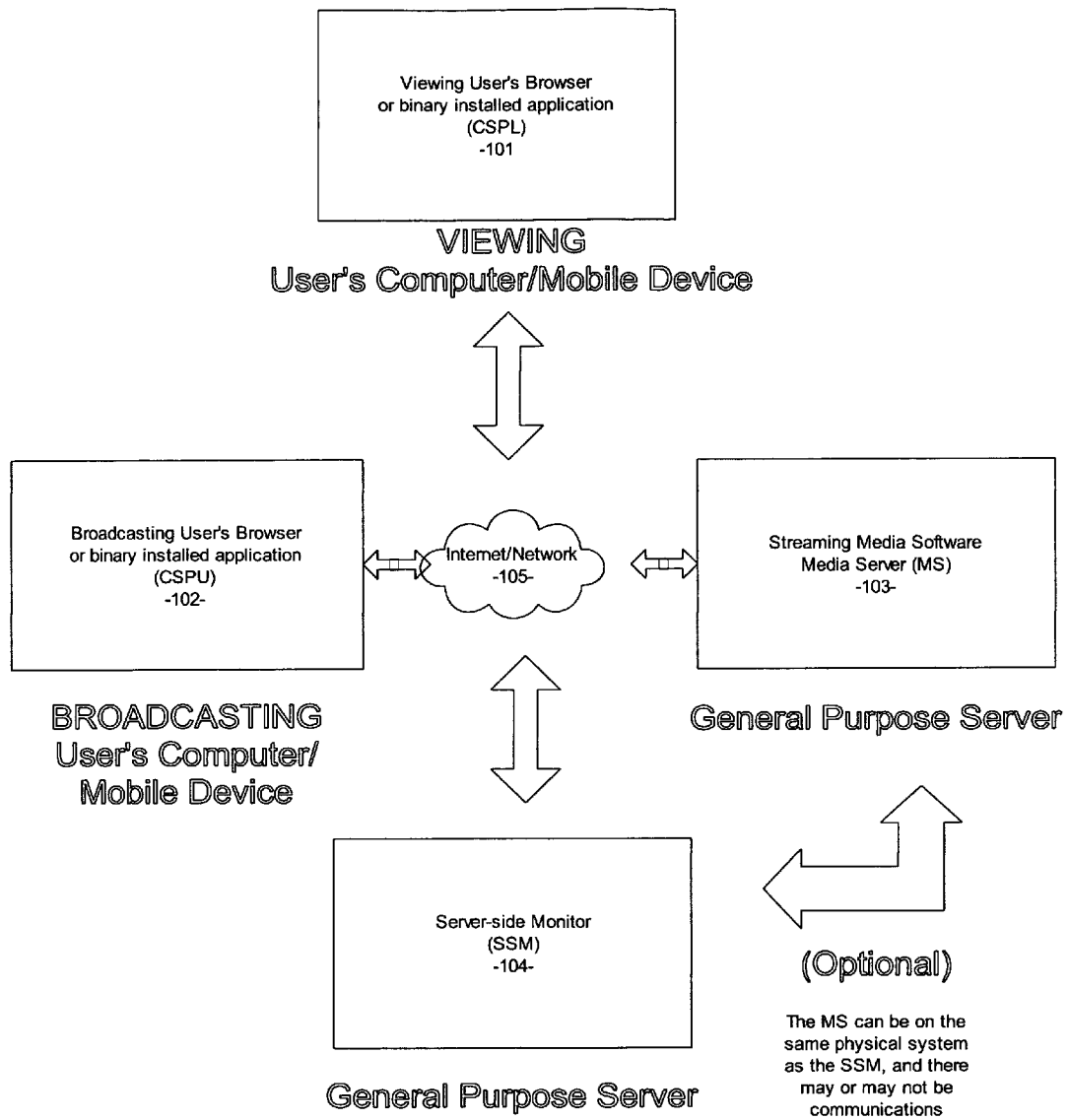
FIG. 1 illustrates end-to-end high-level components in an example embodiment.

A system and method for managing multiple live video broadcasts via a public data network on a single viewing channel is disclosed. In the following description, numerous specific details are set forth. However, it is understood that embodiments of the various embodiments may be practiced without these specific details. In other instances, well-known processes, structures and techniques have not been shown in detail in order not to obscure the understanding of this description. As described herein, a live video stream can emanate from any source (webcam, HD (High Definition) video camera, mobile phone with live video streaming capability) or identifiable entity about whom/which video content can be streamed by a data processor via a data network.

The embodiments of the invention pre-suppose that multiple users desire to display their live video content through a single video channel, thus creating resource contention for the single resource that exists to display their live video streams. Hence, a system and method to queue, control (e.g. detection of broadcast termination, enforcement of maximum time, fair allocation, etc.), and display a single live stream from amongst a list of pending streams is required.

The value of the embodiments of the invention is most noteworthy by allowing multiple users to share the single resource. The users care about sharing the single resource, versus creating their own dedicated resource (like Justin.tv or Ustream.tv), because the single resource has a single, very large audience (among other possible benefits).

For example, embodiments of the invention enable a single, dedicated resource to exist for singers to showcase their singing talent ("live"). They (singers) know that a large audience exists to view singing in general (vs. a small audience they have created on their dedicated video channel). Hence, the user/singer wishes to make a tradeoff in favor of a large, shared viewing audience, vs. a much smaller audience who is only dedicated or interested in them. Without the embodiments of the invention, there is no way to coordinate access to the dedicated resource; because, multiple users cannot simultaneously broadcast live to a single video publishing channel.

The benefits of managing multiple live video broadcasts via a public data network on a single viewing channel are manifold. Audience members can provide feedback (thumbs-up, thumbs-down) and, as well, an embodiment of the invention enables the capability for the audience to control various parameters of the live broadcast. For example, if enough audience members give a "thumbs-down" to the current broadcaster, the broadcast can be "booted" and the next broadcaster will immediately be placed into the broadcast stream with virtually no delay. Alternatively, if enough viewers give a "thumbs-up" rating to the broadcaster, more time can be added to the allocated time for the active broadcaster. Finally, historical data about feedback for a given broadcaster's performance (or historical summation of all of their broadcasts) can be used to create "leaderboards" or other ranking reports that provide very useful data about who are the most effective, entertaining, and enjoyable broadcasters. Talent scouts, agents, and other organizations can leverage this information when fulfilling their casting needs. Hence, there are benefits to both the broadcaster and the audience member (viewer) in facilitating an effective, fair, coordinated sharing of a single dedicated video channel that schedules, queues, and controls individual live broadcasts from anywhere in the world.

There are several obstacles that must be overcome when creating a system to queue, control, and display live video broadcasts on a single video channel. First, broadcasters who are interested in broadcasting live content must express their interest to the system and identify themselves. This includes providing such identifiers as an email address, nickname, handle, username, and/or mobile phone number.

Second, broadcasters would find it useful to supply times for which they are available to broadcast, as well as their timezone (so that their input times can be coordinated to a single universal time (e.g. GMT (Greenwich Mean Time)).

Third, embodiments of the invention can notify potential broadcasters when their timeslot has arrived, and inform them of the number of users currently in the queue (so the broadcaster can determine if they want to wait, or perhaps skip this timeslot and wait for when fewer users are active in the given timeslot).

Fourth, embodiments of the invention accommodate an option for a user to over-ride their default queue position, if, perhaps, they have paid a surcharge to "cut ahead in line."

Fifth, the embodiments of the invention provide a way for the broadcaster to indicate that they want to wait in the queue, and tell them their current queue position.

Sixth, once in the queue, the broadcaster may need to be able to see their current position (updated dynamically) as well as be notified when their broadcast time nears.

Seventh, to minimize the delay when a broadcaster takes over the dedicated resource for their stream, a mechanism is useful for the broadcaster to "pre-prepare" their broadcasting ability, which means they must see their preview window before they are actually broadcasting live to the audience.

Eighth, the broadcaster finds it useful to have a way to see how many viewers are watching them, where the viewers are located (geographically), see if they are getting thumbs-up or thumbs-down, and/or if they have been granted extra time by the audience. Similarly, they must be able to see their time remaining for the broadcast.

Ninth, the broadcaster should have the ability to terminate their own broadcast if they don't want to broadcast anymore. An embodiment of the invention must detect this and switch streams to the next broadcaster in the queue.

Tenth, an embodiment of the invention needs to detect if an error has occurred and the broadcaster has stopped broadcasting for some reason (network error, computer error, software bug, etc.) and allow for the broadcaster to reconnect within some window of time, or use a heuristic to determine the broadcaster is not coming back, and switch to the next broadcaster in the queue.

Eleventh, an embodiment of the invention may warn the broadcaster and the audience, if audience sentiment is so negative that the broadcaster risks getting "booted" from their timeslot, along with an accommodation of minimum and maximum times for their broadcast.

Further, an embodiment of the invention provides a way to show the current broadcast queue, and the various states (confirmed/notified, etc.) of each broadcaster in the queue, as well as give a broadcaster who is queued-up the ability to remove themselves from the queue.

In addition, a moderator function may exist which allows a user to be in supervisory mode and single-handedly terminate offensive broadcasts.

Another feature which is quite useful is to record and optionally make available segments of live stream for future use. Embodiments of the invention integrate stream recording as part of the core components.

Finally, an embodiment of the invention must overcome a large hurdle of how to synchronize a large viewing community (connected to streaming media servers) but have the source of the content change (different broadcasters on the same virtual media stream).

The implementation details of these requirements in an example embodiment are now discussed.

Embodiments of the invention consist of several components.

The software which runs on a traditional web/Internet-capable server is called the Server-Side Monitor (SSM) (see component 104 in FIG. 1). The SSM is responsible for maintaining the state of each connected session, processing signup requests, managing the queue, expiring elements of the queue, and essentially is the virtual monolith of application code that manages the end-to-end activity of the various embodiments (the SSM is functionally separate from the Media Server (MS) which publishes and streams the audio/video content). The SSM can be broken into several parts and uses a database (RDBMS (Relational Database Management System)), persistent storage, caching technology, threading, network communications, and typical web/network communications protocols. The SSM may or may not communicate directly to (and/or manage) the streaming media server (MS) depending on the type of MS used and the requirements of the application. Embodiments of the invention do not require explicit communication between the MS and SSM to operate as described below.

The SSM communicates to client applications that run on audience member computers or broadcasters' computers. The communications is primarily a polling-type of paradigm because the client application must maintain a near real-time state with the state of the broadcaster and queue, or the user experience will be degraded (e.g. if a new user is broadcasting, but the name of the prior broadcaster is still visible, this is a poor user experience).

The term "polling-type" of software is used loosely because there are many actual implementations of polling-type of communications and embodiments of the invention work equally well with any scheme. The standard polling technique for Web 2.0 applications (best exemplified by AJAX (Asynchronous Javascript and XML (Extensible Markup Language))) in web-based communications) requires the client application (browser-based software) to query the server (SSM) to get updated information. The polls might occur once per second, or every 5 seconds, etc. Further, individual commands to the SSM can be issued with polling, or multiple commands can be batched together for maximum efficiency, if their poll times are similar (e.g., see FIG. 7).

Because this type of polling can be a resource drain on the server, when implemented by tens-of-thousands of client browsers, a variant of traditional polling might be used. This often goes by the name "BOSH" (Bidirectional-streams Over Synchronous HTTP) and refers to the client initiating the poll request, but the server (SSM) does not respond to the request until there is new data to provide (or a maximum time has elapsed and then null data is returned and the BOSH poll is re-issued). Hence, the BOSH implementation does not require as many short-lived connections, but it does have the required offsetting tradeoff of having to maintain many more long-lived connections (which can also be a resource load). Embodiments of the invention operate exactly the same way, no matter what type of polling protocol is used (see FIG. 7). Note that BOSH goes by other names such as "COMET," "Ajax Push", "Reverse Ajax", "Two-way-web," "HTTP Streaming," and "HTTP server push."

The software which runs within the user's browser is called the client-side player (CSPL) (see component 101 in FIG. 1), if used by an audience member. If used by a broadcaster/publisher, it is called the client-side publisher (CSPU) (see component 102 in FIG. 1) and varies from the CSPL because it supports the ability to stream content via the user's microphone and camera (as well it can potentially be in "audience" mode [CSPL] until the time to broadcast occurs and then it switches to CSPU mode). As well, the CSPU differs from the CSPL in other ways described below. Note, the CSPL and CSPU may or may not be a single piece of software delivered to the user's browser. A highly secure implementation may use a completely different binary rendering of the CSPU versus the CSPL to ensure a viewer could never become a broadcaster through subverting the software. Alternatively, a single piece of software delivered to the client could run in one of two distinct modes (audience member vs. broadcaster) based on runtime configuration information or information retrieved from the SSM in real-time (e.g. AJAX). How the CSPU and CSPL are rendered into a binary format and delivered to the user's browser is not relevant to embodiments of the invention per se. While the description discusses browser-based implementations of the CSPL and CSPU, there is no necessity that the client-side of an embodiment of the invention run in a web browser. Alternatively, the user could download a binary program that is installed on their mobile device or desktop/laptop/notebook computer. The underpinnings of the embodiments remain the same whether the client software is downloaded from a webpage each time the page is visited or installed locally in a one-time action. The CSPL and CSPU implement a polling-type of communication to the SSM to ensure their content and display is accurately representing the real-time state of the broadcasters and queue.

The client computers (audience and/or broadcaster) also communicate with a streaming media server (MS) for the purposes of viewing the live video stream (audience member) or for broadcasting their current live stream (broadcaster).

A streaming media server (e.g. Windows Media, Quicktime, Adobe Flash FMS (Flash Media Server)) is the actual end-point where the broadcaster's content has a rendezvous with the audience player software and implements industry-standard streaming media protocols (e.g. RTMP (Real Time Media Protocol), RTSP (Real Time Streaming Protocol), etc.) (see component 103 in FIG. 1). This is referred to as the Media Server (MS). The MS would typically be a separate physical server (set of servers) because of the large bandwidth requirements needed to support a large number of simultaneous users; however, this is technically not a requirement for small user communities. The MS software could be installed on the same physical server as the SSM, using typical virtualization technologies, or even without virtualization technologies.

Figure 2:
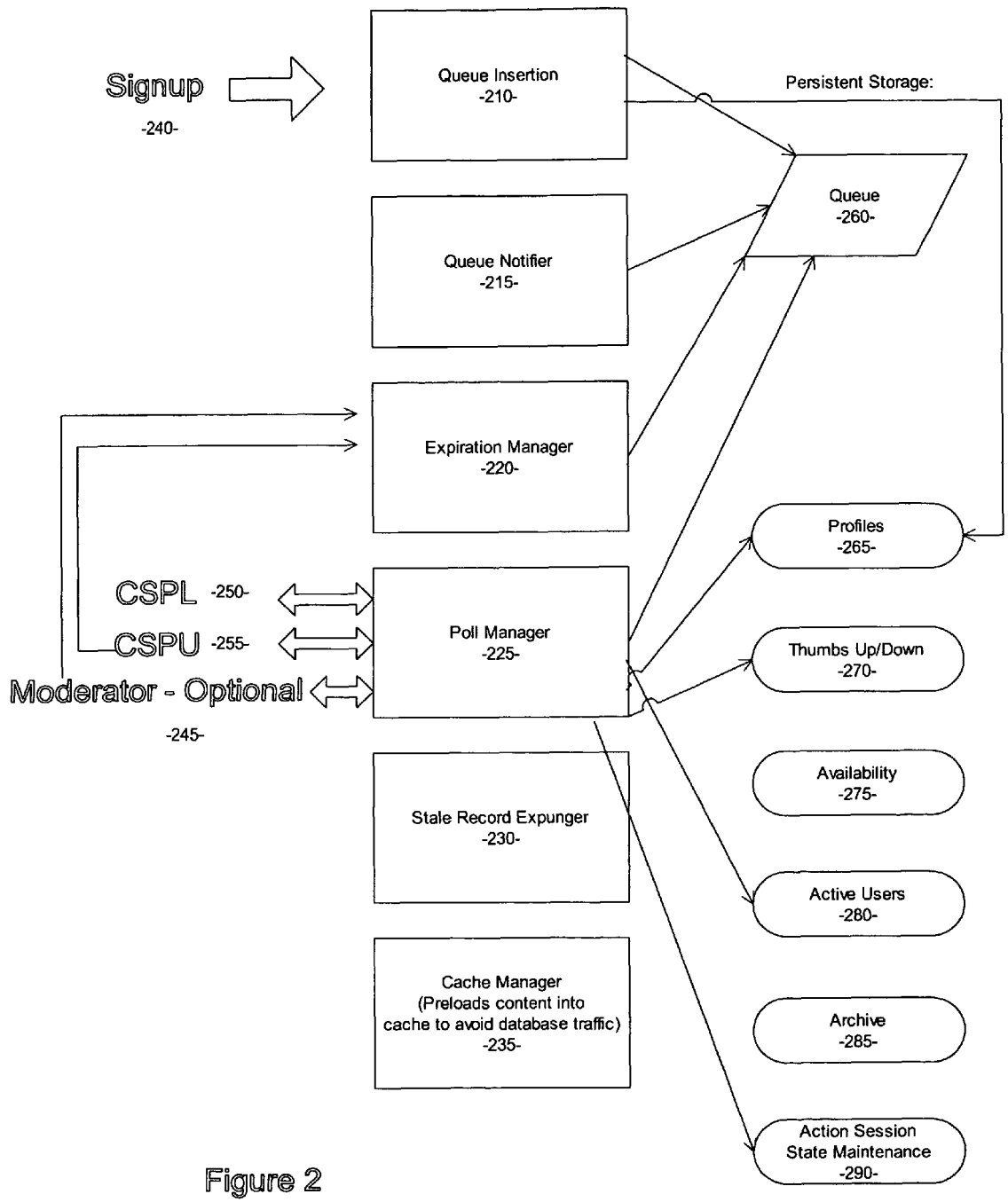
FIG. 2 illustrates the high-level SSM (Server-side Monitor) components in an example embodiment.

The process begins by a user indicating their interest in broadcasting on the dedicated channel (see component 240 in FIG. 2). This is performed via interaction between the client computer (or mobile device) and the SSM running on a web server.

Concept of "Dedicated Channel:" Note that the dedicated channel may be a channel dedicated to a particular type of broadcast, geographic region, topic, or other element that causes the number of broadcasters that want to broadcast on the dedicated channel to exceed the availability of timeslots on the channel. For example, if a dedicated viewing channel for singers is created, and each singer is given 10 minutes to broadcast, the maximum number of broadcasters who could broadcast per hour is 6. If the number of broadcasters who want to broadcast during the given hour is greater than 6, a queuing and control mechanism must be implemented to funnel users through the available timeslots for the dedicated channel. Hence, embodiments of the invention can be used for a single channel that has no criteria associated with the type or content of broadcast, or, alternatively, can be used on dedicated channels which focus on specific types (e.g. singers), topics (politics), geographies (e.g. all broadcasters must be from Uruguay), or other similar groupings. In general, embodiments of the invention are used to queue, control, and display streaming video content in a single-threaded manner when there are multiple users who wish to stream their live content, at the same time. Without the embodiments of the invention, there is no way to fairly coordinate access to a single broadcast Internet-based video channel from multiple users who want to broadcast at the same time.

Figure 4:
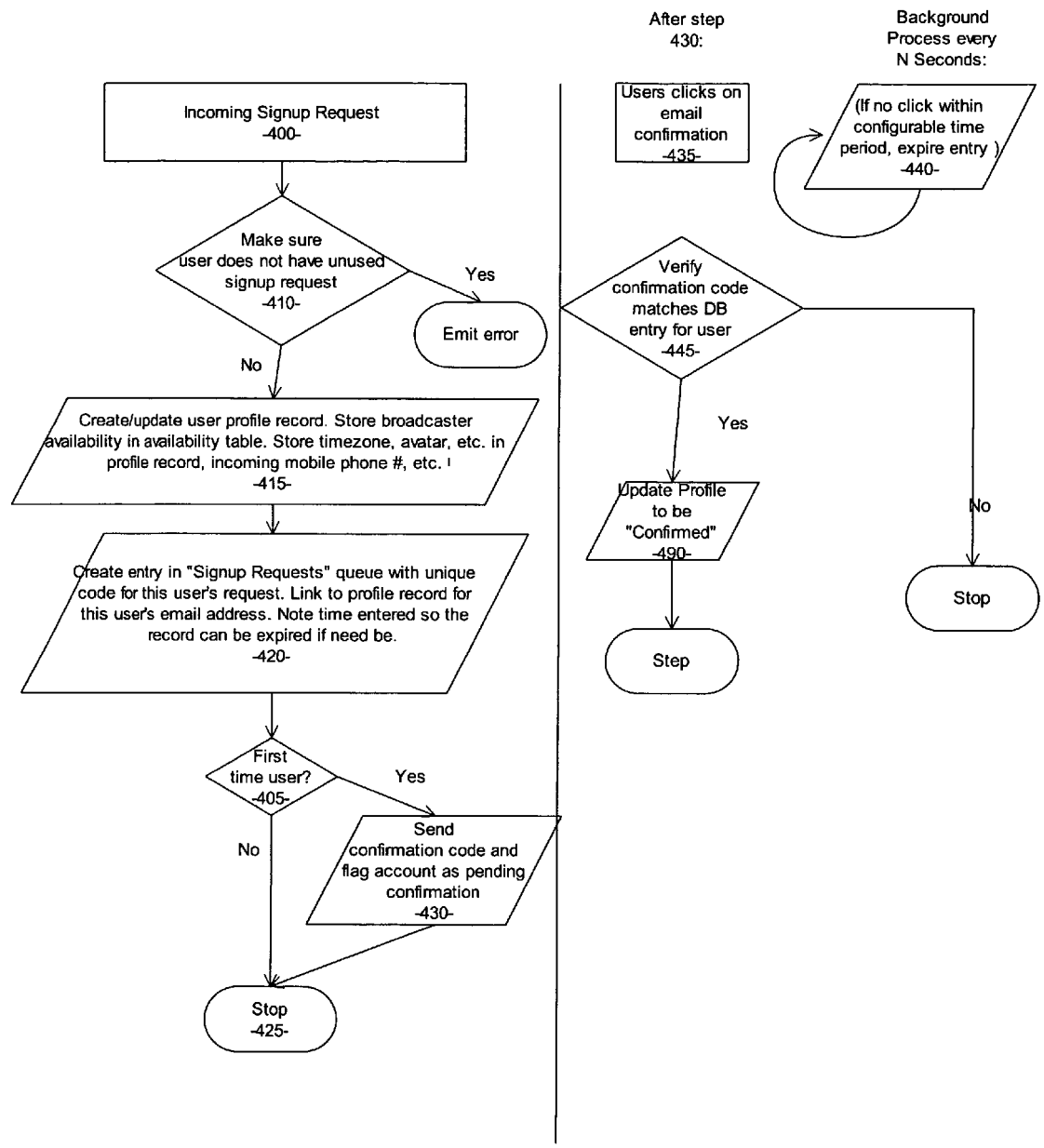
FIG. 4 is a processing flow diagram illustrating the Signup process in an example embodiment.

In all of these cases, once qualification of the broadcaster occurs (e.g. qualification equates to verification they are from Uruguay, in the above example), the broadcaster must identify themselves and provide a way for them to be notified once a desired timeslot becomes available (see component 240 in FIG. 2 and processing step 400 in FIG. 4). The broadcaster can also provide ancillary data ("screen name"), photo/avatar, preferences, etc. which can be used in various places throughout a website implementing an embodiment of the invention. The notification to the broadcaster, when their timeslot becomes available, can be email, SMS/text message, automated phone call, or any other mechanism that can be reasonably automated given the state-of-the-art of notification technology at the present time. This is performed by the Queue Notifier (QN) (see component 215 in FIG. 2).

Typically a verification process is done before formally entering the broadcaster into the system, but this is of course an optional step. For example, ensuring a legitimate email address was supplied could be done before putting the user into the queue of broadcasters for a timeslot. A CAPTCHA (Completely Automated Public Turing test to Tell Computers and Humans Apart) could also be used to prevent automated software from creating an account. Then, the broadcaster would click on a link emailed to them to verify they own the email address they entered (see processing step 435 in FIG. 4). Similar schemes can be done for phone numbers or mobile phone numbers (via SMS (short message system)/text message). For example, a code can be sent via SMS to the supplied phone number, which must be entered on a web page, or responded to via a reply SMS.

The broadcaster applicant must also provide their timezone, and the times during the day, week, etc (general purpose calendar) at which they are available to broadcast. Similarly, the broadcaster could choose "next available" and an embodiment of the invention would set their selection to be the current time, plus some additional factor (such as 24 hours). The day/time/timezone information is converted to a normalized GMT (Greenwich mean time) so that accurate detection of the broadcaster's availability can be calculated (see processing steps 310 and 315 in FIG. 3). Other mechanisms can be used, such as storing the GMT offset, or other common time normalizing algorithms. Note that the varying levels of time availability can be indicated, down to the hour, minute, specific dates, and days of the week. Ultimately, an embodiment of the invention stores the broadcaster's time availability in persistent storage (see component 275 in FIG. 2) so that it can know when to notify the user that the timeslot has become available.

Typically the user's profile would be stored in a "profile" table in an RDBMS (relational database management system) (see component 265 in FIG. 2) and the availability information would be stored in an "availability table" (component 275 in FIG. 2), with the relationship being maintained by the user's email address (or other unique data such as userid, mobile phone number, etc.). Finally, the actual request to get in the broadcast queue is typically stored in another RDBMS table, perhaps called "Signup Requests" (see component 295 in FIG. 2). However, the actual segmentation of this information could be done in a variety of ways and does not impact the specifics of an embodiment of the invention. Various forms of persistent storage, RDBMS, table structures, schema layouts can be used.

Queue Notifier: Embodiments of the invention implement a program that runs (either continuously or at a frequent periodic interval) and checks the current date/time and compares the value to the list of all validated (e.g. email confirmed, SMS confirmed) broadcasters in the system who have indicated they are available in the current timeslot (see FIG. 3). For the purposes of this application, this software module is called the "Queue Notifier" (QN).

The QN runs frequently to detect new requests put into the Signup Request list (see component 295, FIG. 2). First, the QN gets the current system time and converts that to a normalization scheme consistent with how the users' availability times are normalized (see processing step 310, FIG. 3). Then, persistent storage/RDBMS is queried to find all the validated user requests whose availability time matches the current time (see processing step 312, FIG. 3). For each of these users, analysis is performed.

Figure 3:
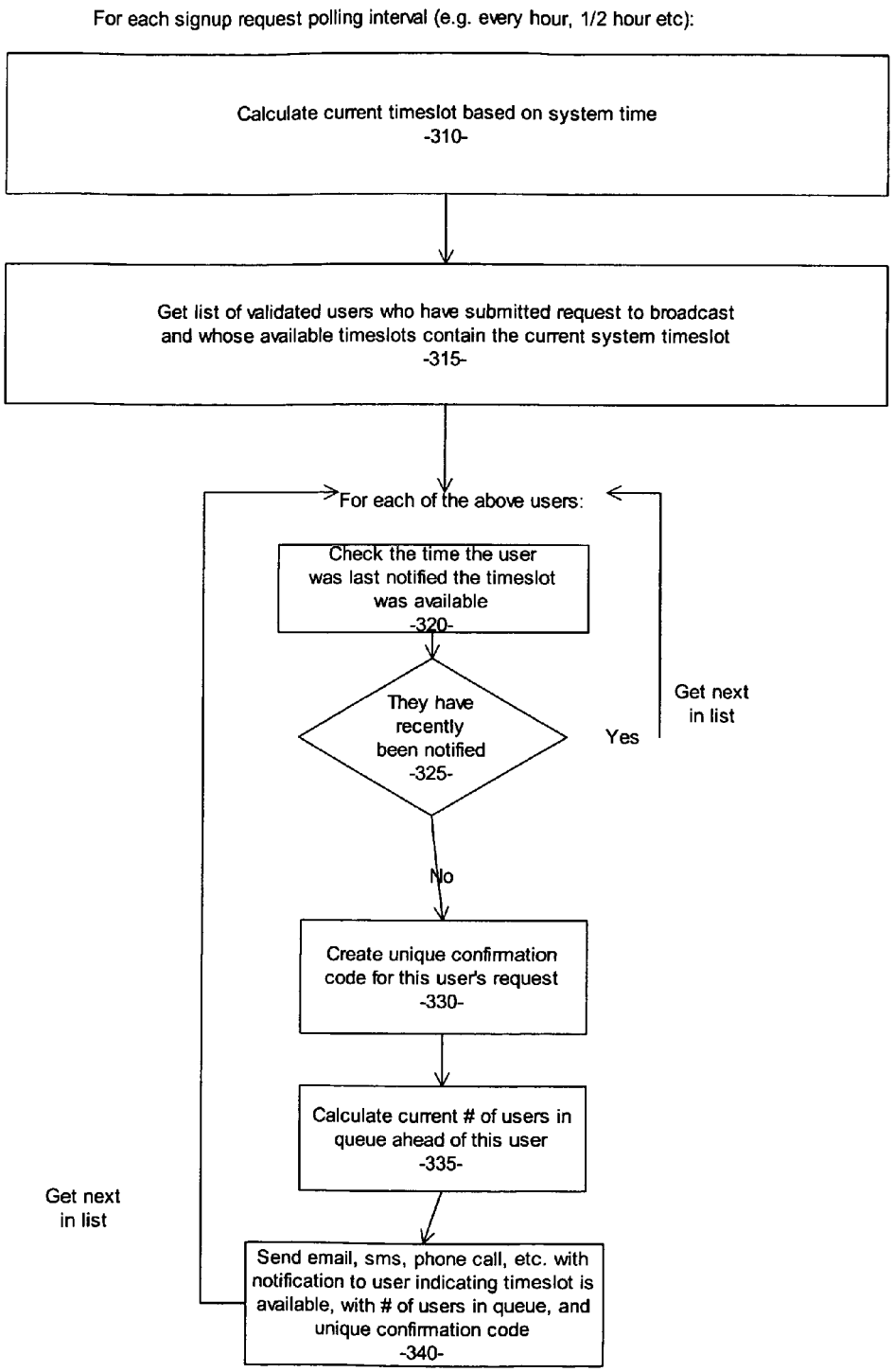
FIG. 3 is a processing flow diagram illustrating the Queue Notifier in an example embodiment.

The QN checks to see the last time the broadcaster was notified about the timeslot being available, and if it was within a small period of time (5-15 minutes, configurable) the QN would skip notification of the broadcaster since it does not want to excessively notify the broadcaster (see processing steps 320, 325 in FIG. 3). The broadcaster could be provided an option to specify how frequently they want to be notified of timeslot availability, and in this case the QN would compare the time-last-notified to the frequency preference for the broadcaster to determine whether the notification should be sent or not.

If the user has not been recently notified, a unique confirmation code is created for this request so it can be identified and tracked as their queue state changes (see processing step 330 in FIG. 3).

The current number of users (waiting to broadcast in the queue) is calculated so that the notified user can see at this instant how many people are "in line" ahead of them (see processing step 335 in FIG. 3).

An embodiment of the invention sends an email, text message, automated phone call, etc. alerting the user that their timeslot has become available, and updates the time the user has been notified (see processing step 340, FIG. 3). Optionally, the user can indicate which of these methods to use for notification (combinations or just one). The email or SMS should contain an HTTP (Hypertext Transport Protocol) link which the user can go to on their computer or mobile device (SMS) which indicates their willingness to get "in line" for broadcast in the current timeslot. The link contains information that identifies the broadcaster as well as a unique request ID (confirmation code) that must already existing in the system to ensure broadcasters don't nefariously try to get "in line" without the system verifying they are valid requests (see processing 410 in FIG. 4). To avoid broadcasters attempting to grab several adjacent timeslots, an embodiment of the invention implements an algorithm that requires the broadcaster to complete a broadcast session currently in queue, before requesting another one. Expiration of stale requests is implemented so that thousands of untaken notifications don't burden the system. Any notification which is not responded to within 24 hours is removed from the system. This timeframe can be easily configured to any value (see component 230 in FIG. 2).

Figure 5:
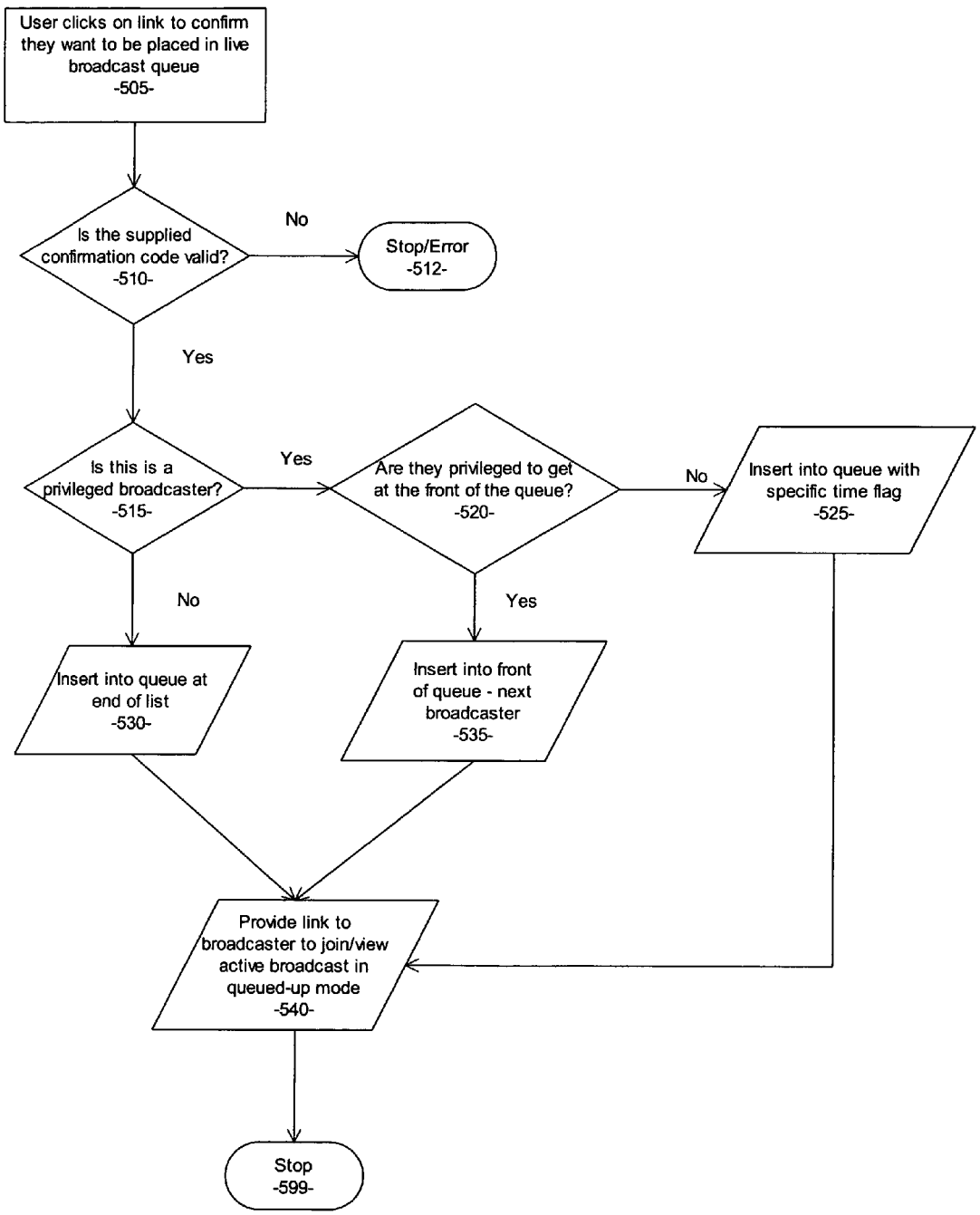
FIG. 5 is a processing flow diagram illustrating Queue Insertion in an example embodiment.

Once the broadcaster has clicked on the link, the broadcaster is registered in the system and is placed in the queue of potential active broadcasters. This is referred to as queue insertion (QI) (see FIG. 5). If the broadcaster is a privileged broadcaster and has been allowed the special capability to "cut ahead" in the line, they can be placed at the front of the queue (see processing steps 520, 535 in FIG. 5). If the privileged user has been allocated a specific time at which they begin, they can be placed in the queue with a special flag that indicates "start at 1:52 PM" (or whatever time is relevant) and the queue manager will enable their session at that specific time once the prior broadcast has completed (see processing step 525, FIG. 5). Otherwise, the broadcaster is placed in queue after the last broadcaster placed in the queue (first come, first-served algorithm) (see processing step 530, FIG. 5). The confirmation code (unique id) submitted with the "join the queue" request must be validated against pending entries in the database before any queue insertion is completed (see processing step 505, FIG. 5).

Figure 18:
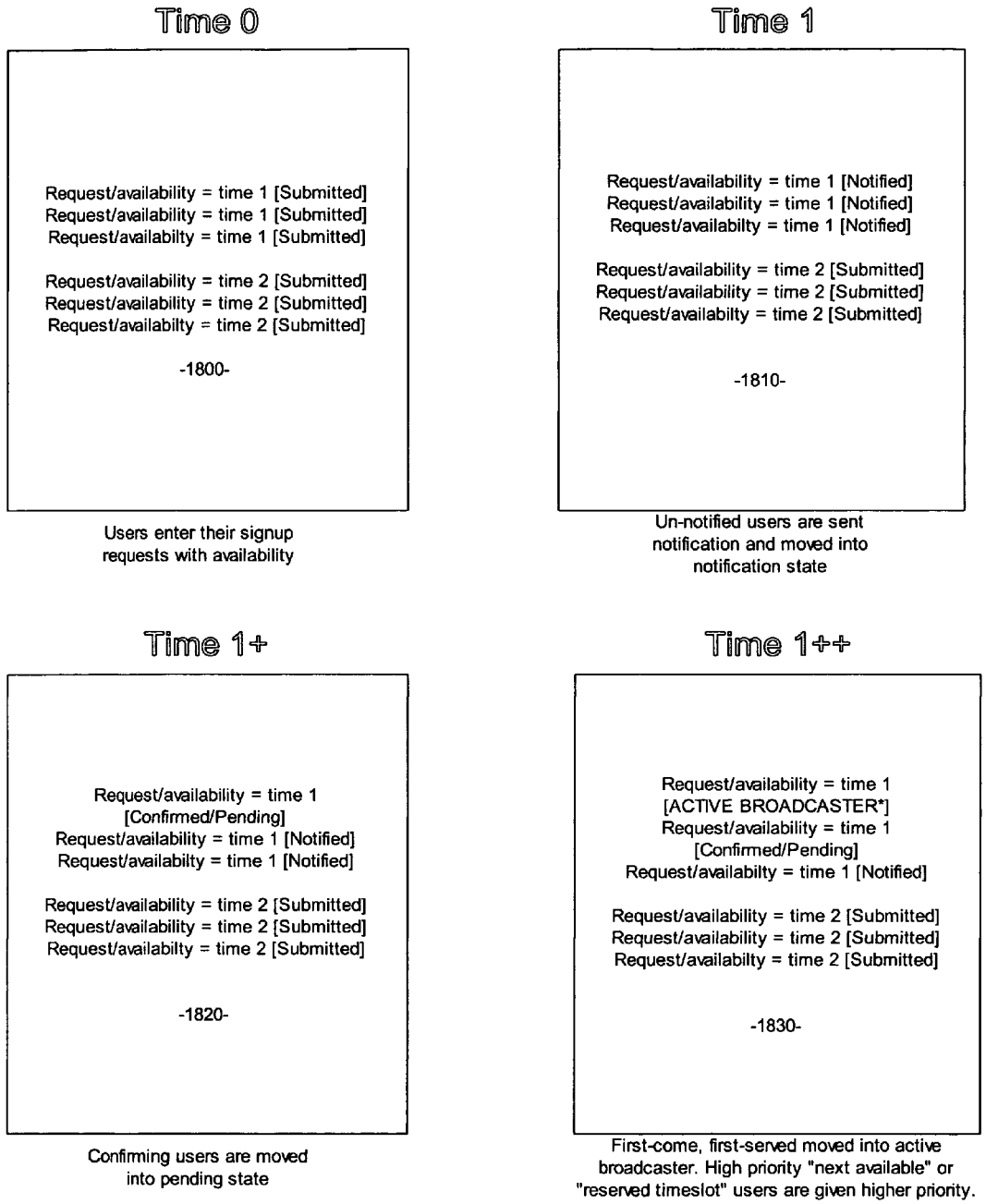
FIG. 18 illustrates the various Queue Phases in an example embodiment.

The high-level evolution of a broadcaster's queue state is depicted in FIG. 18. Upon the initial signup request (with availability information), the broadcaster's queue state is "submitted" (see component 1800 in FIG. 18). Once the timeslot matching the user's availability arrives, a notification (SMS/email/etc.) is sent and the state transitions to "notified" (see component 1810 in FIG. 18). When the user acknowledges the notification and clicks on the link to enter the live queue, their state changes to "Confirmed/Pending" (see component 1820 in FIG. 18). Finally, once the user becomes the active broadcaster, their state changes to "Active Broadcaster" (see component 1830 in FIG. 18). Once their broadcast is complete, they are removed from the queue, or, alternatively, flagged as "completed."

Detection of a user closing their browser, terminating the application, turning off their computer, or experiencing a network connection problem, while they are queued (not broadcasting) can be detected by the invention by examining the most recent poll time compared to the current time, and, optionally, removing the user from the queue if such inactivity is detected.

Broadcast Queue Display: An embodiment of the invention provides the ability to display the current list of queued broadcasters and their status information (e.g. "currently live", "queued in position 3, has been waiting 10 minutes", "notified/not confirmed", "New York, N.Y.", etc.) (see FIG. 6).

Requests come from the CSPU and CSPL in a polled manner. Optionally, validation of the request to get the Broadcast Queue Display can be performed by the SSM (to ensure robot software agents are not making the requests) (see processing step 610 in FIG. 6).

Data such as the contents of the queue, as well as other polled data (previously described), can be cached instead of directly querying a database/persistent storage for each poll request. Caching technology (e.g. "memcached") can be used to minimize the number of polling requests to persistent storage (RDBMS) and hence a large number of polling requests can be supported with a small number of physical servers.

Figure 6:
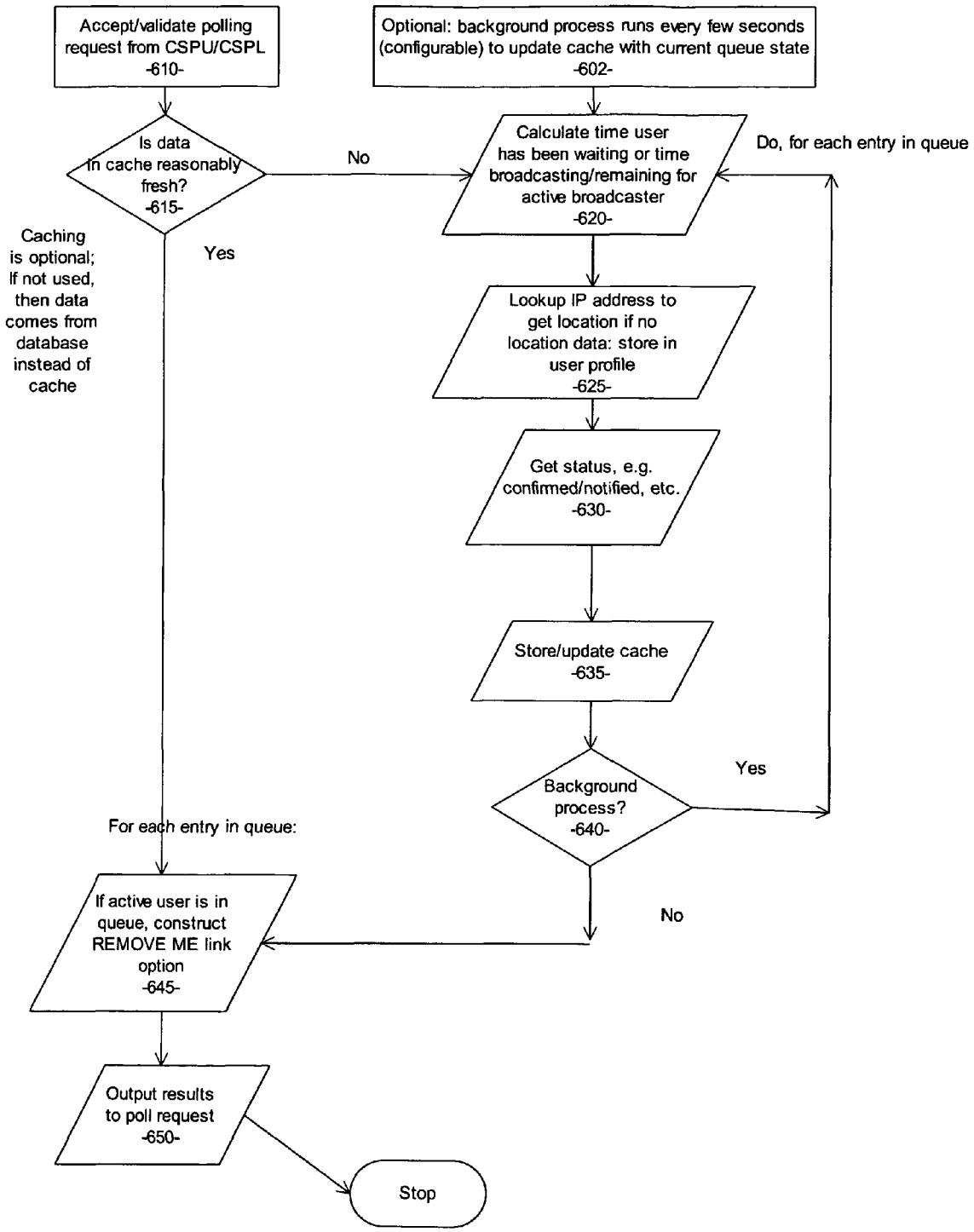
FIG. 6 is a processing flow diagram illustrating maintenance of the Broadcast Queue Display in an example embodiment.

Hence, caching can provide much greater performance. FIG. 6 describes how the Broadcast Queue Display is constructed whether or not caching is used. Note: caching can be accomplished by a background process that updates the cache on a period basis (e.g. every few seconds, configurable) (see processing block 602 in FIG. 6) or the cache can be checked for "freshness" each time a request is handled and if it is determined that the cache is stale, the current request can be used to freshen the cache (see processing block 615 in FIG. 6). Note that an embodiment of the invention does not require caching, nor does it make any difference what type of caching or freshening heuristics is used.

The time each user has been waiting is calculated by comparing the current time to the time the user was placed in the queue (see processing step 620 in FIG. 6). For the active user, the time they have been broadcasting, and the time remaining are calculated instead.

The time remaining in the current broadcast is provided so that a "countdown" clock can be implemented in the client's display. This is useful for both the audience and the broadcaster.

Embodiments of the invention use a database (persistent storage) to keep track of the time the broadcaster was placed in the queue, their location (based on their input value or the Internet address), and confirmation information (e.g. "notified/confirmed" or "notified/not confirmed") (see processing steps 620,625 in FIG. 6). As well, if the user viewing the broadcast queue is a broadcaster (in the queue), then a special HTTP link is provided that allows the broadcaster to remove themselves from the queue (see processing step 645 in FIG. 6). The contents of the broadcast queue are requested by the client (CSPU or CSPL) on a periodic basis (configurable) and the queue contents provided by the SSM are formatted by the client software for display in the user's browser/program (see processing step 650 in FIG. 6).

Figure 7:
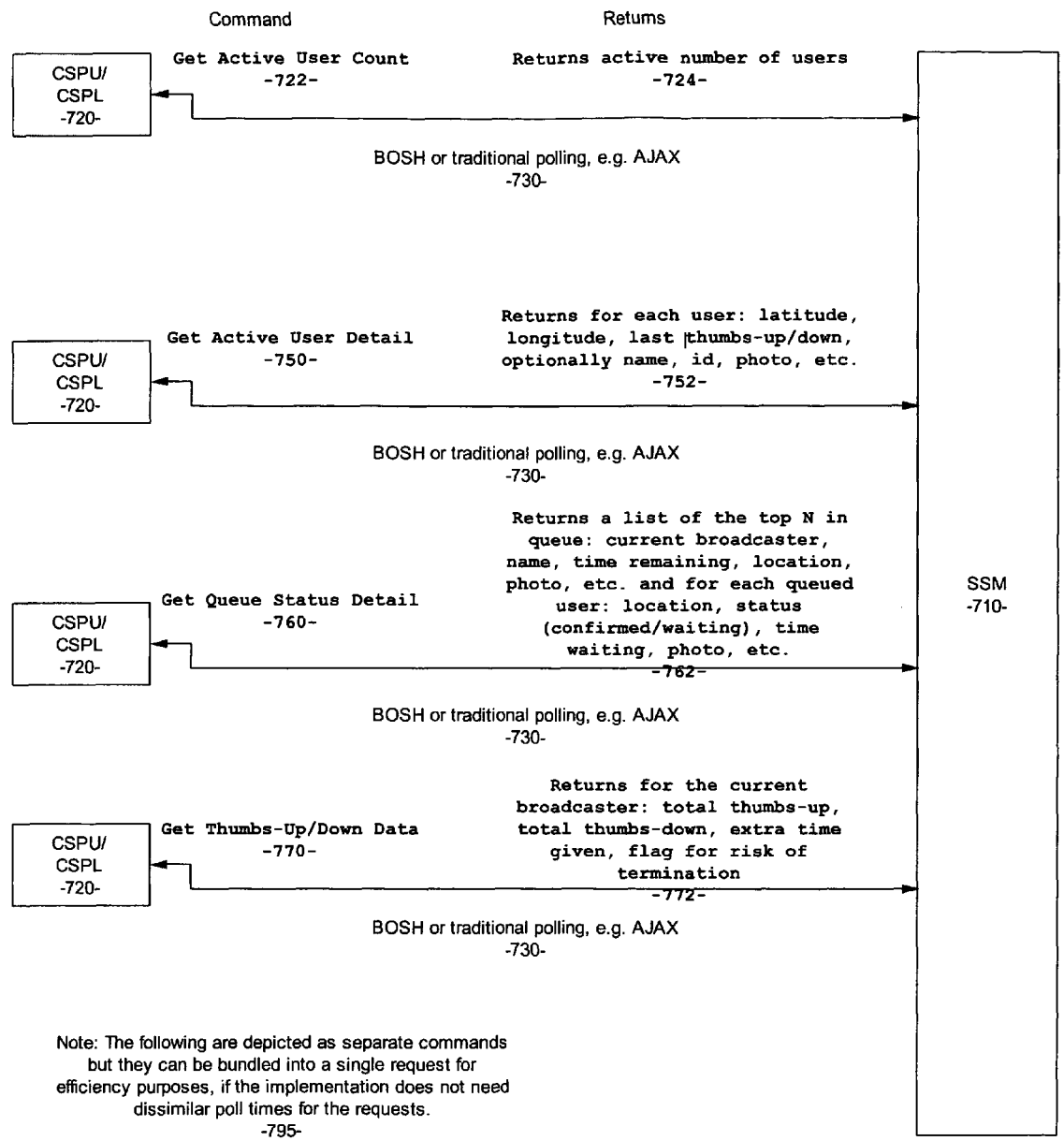
FIG. 7 illustrates the CSPU/CSPL (Client Side Publisher/Client Side Player) SSM Polling Commands in an example embodiment.

Optionally, various poll requests can be bundled together, instead of being issued individually to the SSM (see FIG. 7). This is good for efficiency, but presupposes the same poll frequency is appropriate for all requests (this may not be relevant for BOSH). For example, the "Get Queue Status Detail" poll request might be bundled with the "Get Active User Detail" [which gives the audience detail record with latitude/longitude along with other ancillary data such as the audience member's last reaction (thumbs-up/thumbs-down), etc.]. An embodiment of the invention accommodates grouping of polled commands or having them issued individually. Network conditions, user count, and server resource load are all factors (among others) that dictate the best implementation decision.

Figure 9:
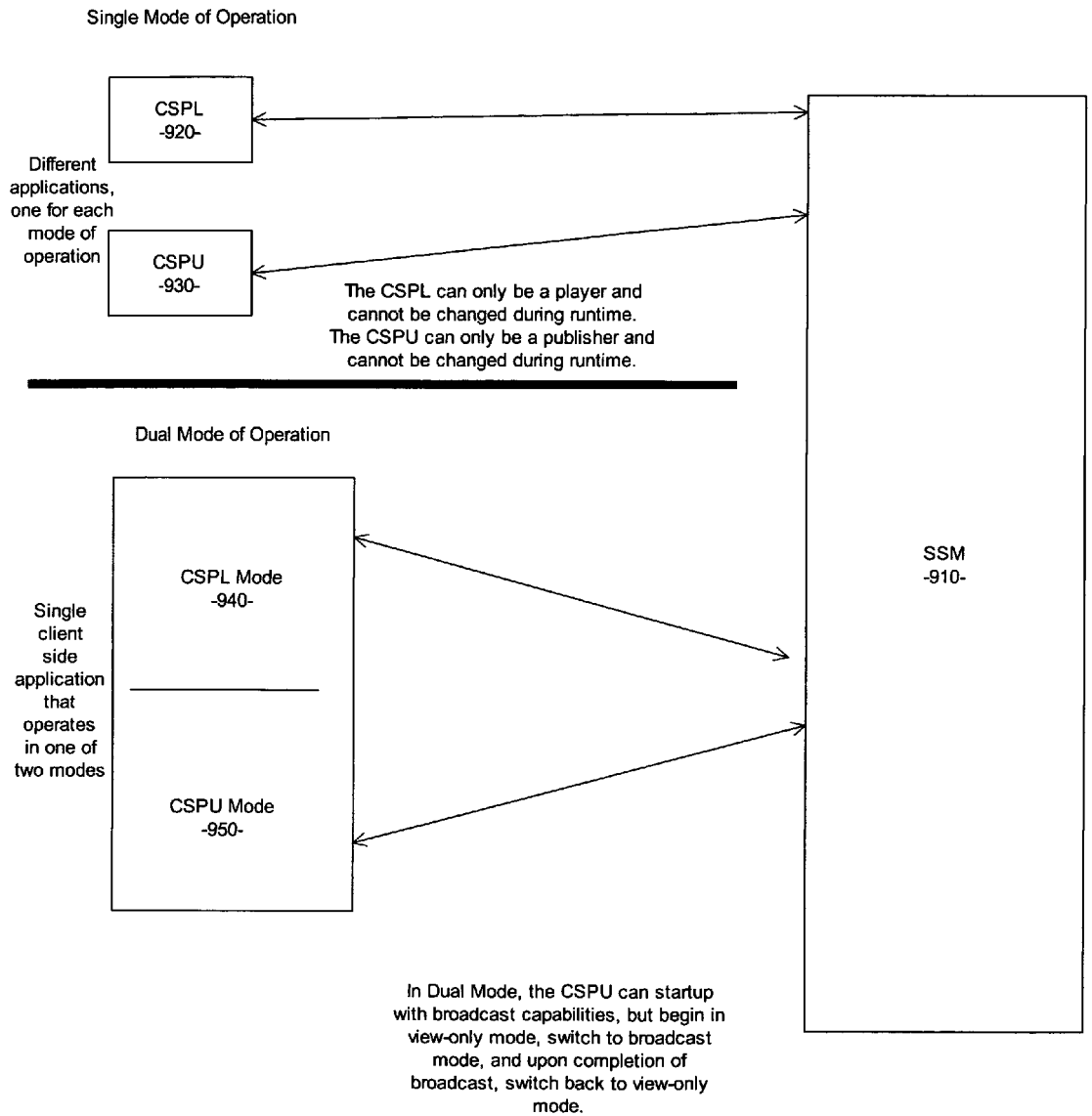
FIG. 9 illustrates the CSPL/CSPU Combined or Separate Modes of Operation in an example embodiment.

"Prepare to Broadcast" Phase: Once the broadcaster has indicated they want to wait their turn (perhaps by clicking on a link an email), they are presented with a page similar to what the audience members see, but with some additional capabilities (CSPU). The CSPU can be delivered as separate application from the CSPL or both can be delivered to the user and based on startup parameters or runtime parameter, they can configure themselves appropriately (see FIG. 9).

Figure 8:
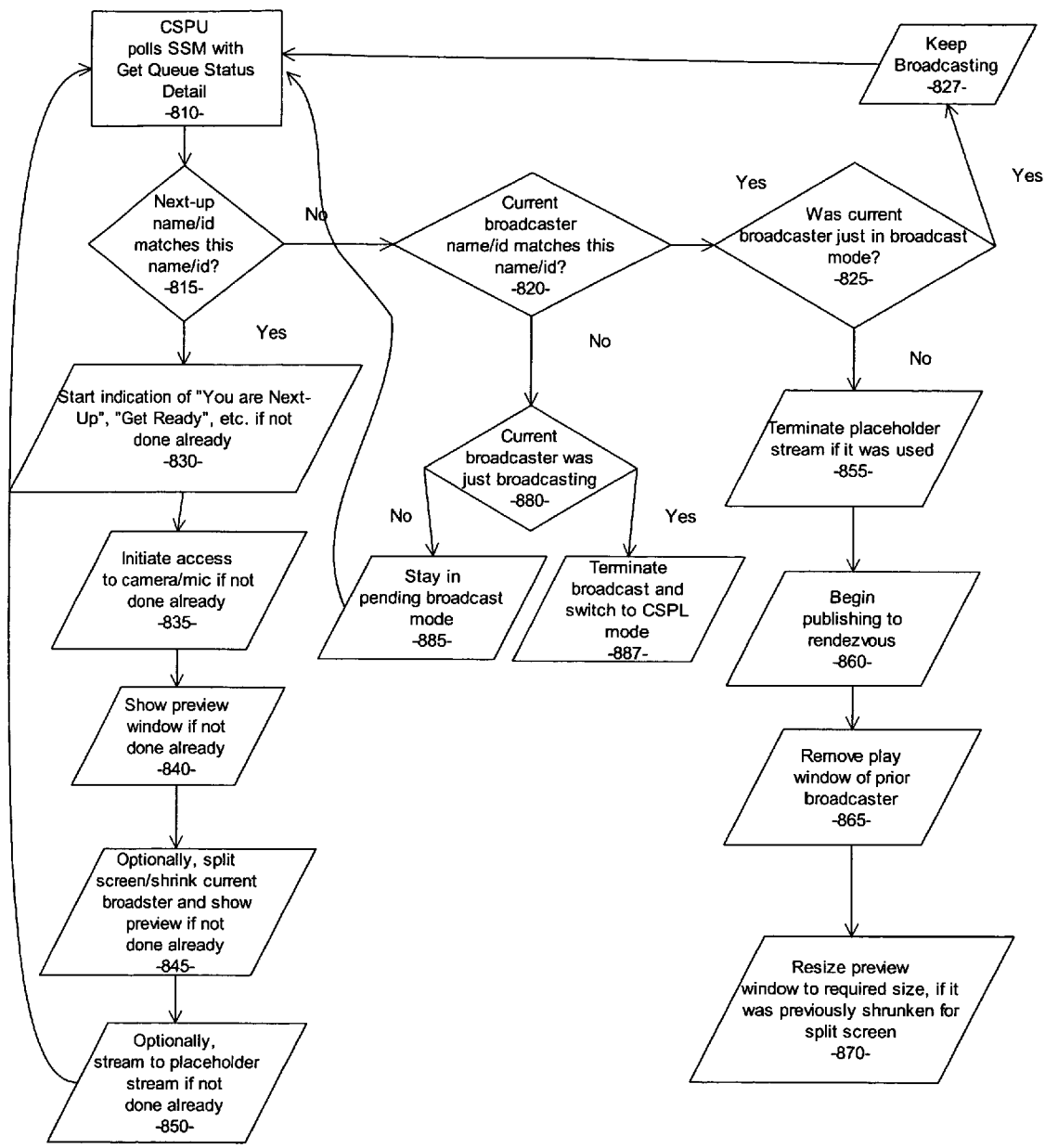
FIG. 8 is a processing flow diagram illustrating the "Prepare to Broadcast" phase in an example embodiment.

First, as their time-to-broadcast nears (could be based on "next up" or similar heuristics), the broadcaster is alerted to the fact and encouraged to "get ready" (see processing step 830 in FIG. 8). This phase of pending broadcast is called "Prepare to Broadcast." This is done by some visual and/or audio cues. Part of this process includes authorization of software to access their camera and microphone, verifying the camera and the broadcaster are positioned properly, etc. (see processing step 835 in FIG. 8). To ensure such "preparation" occurs properly, and so that the broadcaster can simultaneously see what is "live," an embodiment of the invention implements a "split screen" viewer of what is currently being broadcast (of course, "split screen" is just one of many ways to show dual video content), and adjacent to the current broadcaster is the "preview" window of the pending broadcaster (only visible to the pending broadcaster) (see processing steps 845, 850 in FIG. 8). This way the pending broadcaster can keep track of the channel's current activity and simultaneously ensure they are ready to broadcast when their timeslot is active.

Without this "Prepare to Broadcast" phase, there could be indeterminate delays when switching broadcasters, and the audience would have a suboptimal experience. The currently playing window can be made smaller to accommodate a small preview window or a new video preview panel can be created with the pending broadcaster's preview content, or many other similar mechanisms to achieve the same result of displaying the currently playing video content on the same screen as the preview window for the pending (next up) broadcaster.

The pending broadcaster ("next up") can see the maximum time countdown for the current broadcaster, and also see if the current broadcaster is likely of getting terminated prematurely because of excessive "thumbs down" votes from the audience.

Note that the pending broadcaster has a preview window but is not actually broadcasting to a streaming media server. Only at the point that their session becomes "live" does their broadcasting software make a connection to the streaming server and begin publishing on the live stream. Optionally, the pending broadcaster (next up) could be connected to a "placeholder" publishing stream on the Media Server (MS) to ensure their connection is properly streaming (see processing step 850 in FIG. 8). This connection would be terminated and be re-connected to the live publishing stream rendezvous once the pending broadcaster switches to the active broadcaster (see processing step 855 in FIG. 8). Note: If Audience Mediation is used, the placeholder stream is actually the stream to which the audience gets switched to, and the broadcaster continues to publish to the placeholder stream as their live stream.

Audience vs. Publisher Mediation: Herein lies one of the more intriguing and complex elements. There are two methods by which an embodiment of the invention describes how to create a rendezvous point on a streaming media server, between different broadcasters and a set of audience viewers. Either method can be used depending on various implementation goals.

First some background information about streaming media is provided. Streaming media typically consists of a player component (what the audience/viewer uses) and a streaming media source (the broadcaster, or possibly pre-rendered content). (This description does not describe peer-to-peer streaming media connections because such an implementation is not relevant for an embodiment of the invention.) Typically, the way a viewer and a publisher (broadcaster) rendezvous is based on a stream name on a given Internet media server address. The basics are the same whether or not Adobe Flash, Windows Media, Apple Quicktime, Real Networks RealMedia or other formats are used. Hence, key to embodiments of the invention is how to keep the audience in communication with the streams whose origination sources change every time the broadcaster changes.

The first method is termed "Audience mediation" (see FIG. 11). Audience mediation means that the stream name (rendezvous point) is a unique name for each broadcaster. Hence, each broadcaster (CSPU) broadcasts to a unique rendezvous point, and an embodiment of the invention tells each viewer (player) (CSPL) to switch to a different rendezvous point each time the broadcaster changes (see components 1120, 1130, 1140, 1150 in FIG. 11).

Figure 10:
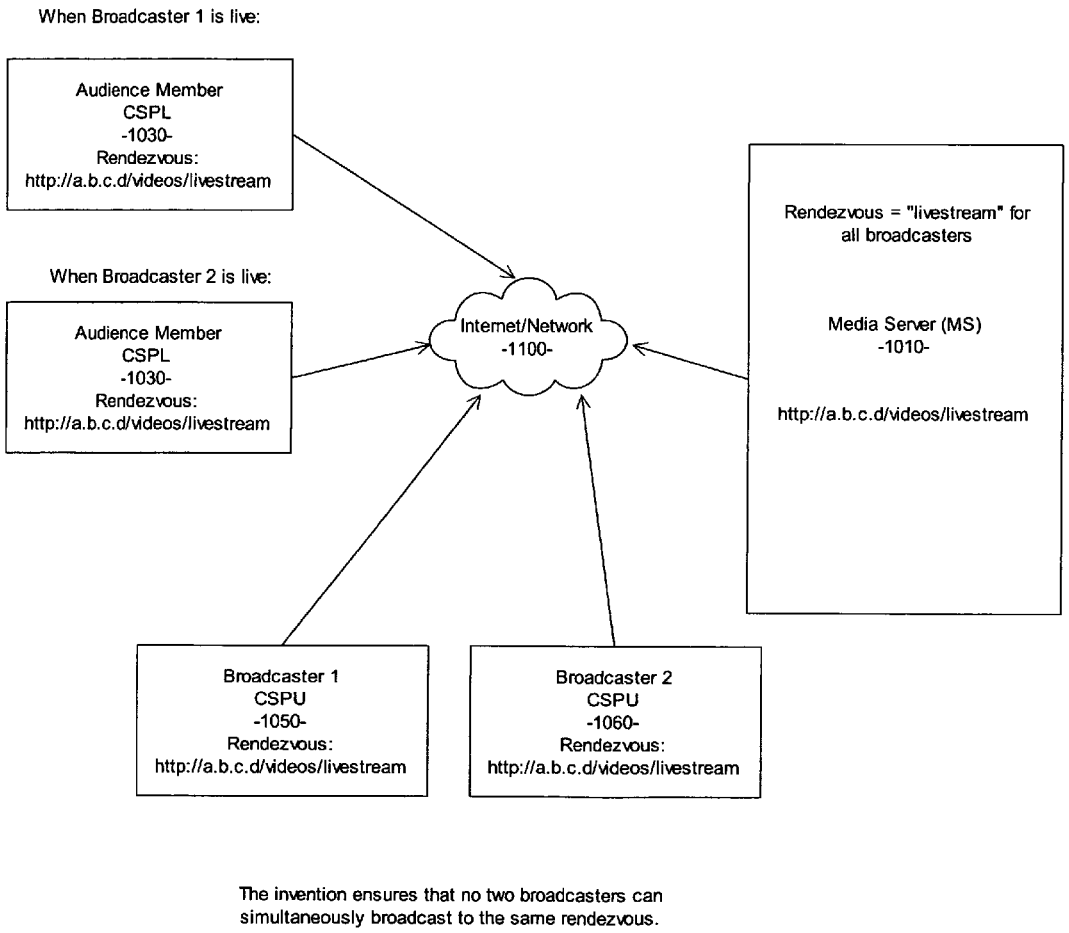
FIG. 10 illustrates Publisher Mediation in an example embodiment.

The second method is called "Publisher mediation" (see FIG. 10). Publisher mediation means that the audience/viewer players (CSPL) always rendezvous to the same stream, and each broadcaster's publishing module (CSPU) streams to the same rendezvous stream name, but an embodiment of the invention ensures that two broadcasters cannot publish to the live stream rendezvous at the same time. This is accomplished under software program control of each CSPU (see components 1010, 1020, 1030, 1040, 1050 in FIG. 10).

Each approach has a set of advantages and disadvantages, and embodiments of the invention support the usage of both techniques.

The advantage of Audience mediation is that it is impossible for a hacker to subvert the system and cause the audience to view an unauthorized stream. This is because the hacker would have to know the very large random number that is used for the stream ID, and attempt to publish to the stream rendezvous before the authorized publisher takes over the stream. This is effectively impossible. The disadvantage of Audience mediation is that once a new broadcaster takes over the live stream, all audience player instances must switch to the new stream rendezvous. This means if there are 1,000,000 active viewers, the streaming media server must accept 1,000,000 stream change requests, and this would take a period of time (perhaps up to 30 seconds) and hence delay the real-time experience of the audience.

The advantage of Publisher mediation is that when the publisher (broadcaster) switches to a new source, the audience continues to stream to the same rendezvous and no switching is required and hence creates a seamless, near zero-latency experience. The disadvantage of Publisher mediation is that a sophisticated hacker could attempt to insert their stream feed into the known rendezvous, perhaps in between a switch in broadcasters, if there were enough of a delay. Once the hacker was publishing to the live stream rendezvous, all audience members would see the unauthorized stream and there would be no automatic way to disconnect the stream unless it was detected as unauthorized.

Figure 12:
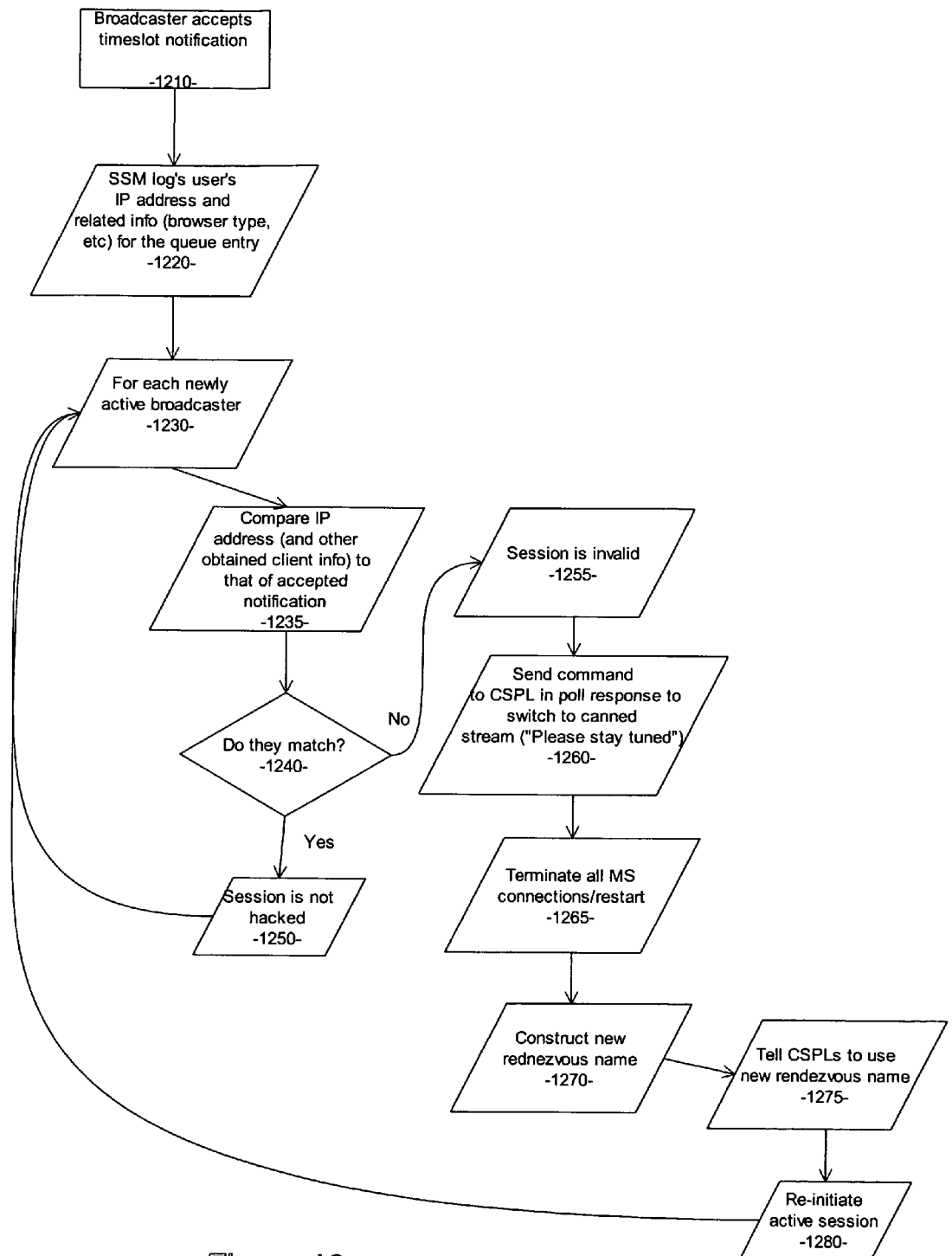
FIG. 12 is a processing flow diagram illustrating Hacker Detection for Publisher Mediation in an example embodiment.

An embodiment of the invention implements a heuristic to prevent the problem associated with Publisher mediation (see FIG. 12). Once a broadcaster accepts the notification, their Internet Protocol (IP) address is logged in the database (other information could also be logged in case the hacker possibly comes from the same IP address on a shared network, e.g. browser user agent, session-specific cookie, etc.) (see processing step 1220 in FIG. 12). An embodiment of the invention requires that when a user begins broadcasting, software (e.g. Javascript, Actionscript, installed binary application, etc.) on the broadcaster's page/application (CSPU) sends (via "AJAX" or other similar RPC (remote procedure call) mechanisms) status information about the current broadcast, such as the current time the publisher has been broadcasting. The server-side implementation retrieves the IP address of this request (and additional optional information mentioned above) and compares it to the IP address (and other optional information) of the user when they were placed in queue (see processing step 1235 in FIG. 12). If the IP address (and other optional information) is different, or if no status update was provided, it can be determined that the current broadcast session was hijacked by a hacker (see processing step 1255 in FIG. 12). In this case, the audience player software (CSPL) is sent a command to switch to a new stream rendezvous and all new broadcast streams use the new rendezvous name (see processing steps 1260, 1265, 1270, 1275 and 1280 in FIG. 12). If the comparison matches, then it can be safely assumed the broadcast has not been hijacked (see processing step 1250 in FIG. 12). Note: there are other similar schemes that can be implemented by providing various information to the MS specifically (such as the IP address that is authorized to broadcast or a specific token (large number) that must be provided in order to connect to the MS in publishing mode). However, these schemes are specific to various features of specific streaming media servers and hence are beyond the scope of embodiments of the invention. They work equally well with embodiments of the invention and can be integrated quite easily.

Broadcasting Phase: The broadcaster software (CSPU) continuously polls the server-side software (SSM) while it is broadcasting to know what is the username/id associated with the current active broadcast, and as well to send the current playhead position of the video publisher, and, indirectly, an activity timestamp from the publisher. These pieces of information are key and are used in the following ways.

Use of current broadcaster ID/name: Once this name/ID matches the username/ID of the pending CSPU username/ID, the broadcasting software (CSPU) is directed to connect to the streaming media server (MS) and begin publishing to the stream rendezvous (see processing steps 820, 825, 855, 860, 865, 870 in FIG. 8). The audience members immediately see the new stream. Once the current broadcaster name/ID differs from the broadcaster's name in the CSPU, it can then be known that the broadcast is complete and the broadcaster stops communicating to the streaming media server (see processing step 820, 880, 887 in FIG. 8). Note: this is only one of various ways to that the SSM indicates to the CSPU that the CSPU is now the active broadcaster. Instead of sending the name, and having the CSPU detect the name matches the current name, the SSM could, alternatively, send a flag in a poll command response that is true or false depending on whether the SSM detects that the CSPU is the active broadcaster (since the SSM maintains the state for each session anyway). Other mechanisms exist such as posting a request to the SSM that only terminates (successfully) once the current CSPU becomes the active broadcaster. Hence, a thread could be dedicated to this function in the client application without the need for polling, per se.

Use of playhead time: On each poll the active CSPU sends the value of the current playhead. The playhead indicates how long the camera has been streaming video to the MS. If the camera stops working, or an error in transmission occurs, the playhead value will stop increasing. This is then detected by the Expiration Manger (EM—below) as a way to determine if the broadcaster has stopped broadcasting (the exact reason is unknown). The SSM tracks the previous value of the playhead supplied, and compares the current value to the prior value. If the value is different, it not only records the playhead value, but the current time. This way it can be determined if the playhead stops changing (see section about Expiration Manager) (see processing step 1320 in FIG. 13).

Use of CSPU timestamp: By virtue of each poll request, a timestamp is indirectly sent to the SSM which indicates the current CSPU is active. Hence, an entry can be made in a database (or cache) which shows the last time the CSPU initiated a poll request. If the user/broadcaster closes their browser, shuts off their computer, or if their Internet connection fails, this timestamp will stop increasing, and the Expiration Manager (EM) will detect the user is no longer active (see processing step 1325 in FIG. 13). An embodiment of the invention supports a configurable option for "inactivity time" that is used to detect a failed broadcaster/CSPU. In other words, in some applications, it may be useful to give the broadcaster sufficient time to reconnect to their network, restart their browser, etc. and the time allotted for this can be quite long. In other applications, even a small gap may warrant termination of their position in the broadcast queue.

Current Broadcaster Audience Statistics: The broadcaster (CSPU), while broadcasting, continues to poll the server-side (SSM) to retrieve various statistics including the number of thumbs-up, thumbs-down, number of active audience members, geographic information for each audience member, extended time granted by the audience, etc. The same thing is true of the CSPL. The request for Audience Statistics can be lumped-in with other poll requests to increase efficiency, or it can be done separately if its poll time frequency is dissimilar from other poll requests. A cache may be used to support a large of number of users/requests and reduce the request count to the database.

The handling of the request requires acquiring the relevant data from various database tables and/or persistent storage (or cache) and returning the results back to the client in a form readable by the client. If the data is already in the cache and not stale, it can be returned immediately (see processing step 1420 in FIG. 14). If the data is not in the cache it can be retrieved from a database or persistent storage, starting with the active audience member count (see processing steps 1430, 1440 in FIG. 14). The number of active audience members can be calculated by counting the number unique session IDs from the poll table, over the last N (configurable seconds). An alternative method is counting the number of unique rows of a session table whose last-poll-time column has been updated within N (configurable) seconds.

Figure 14:
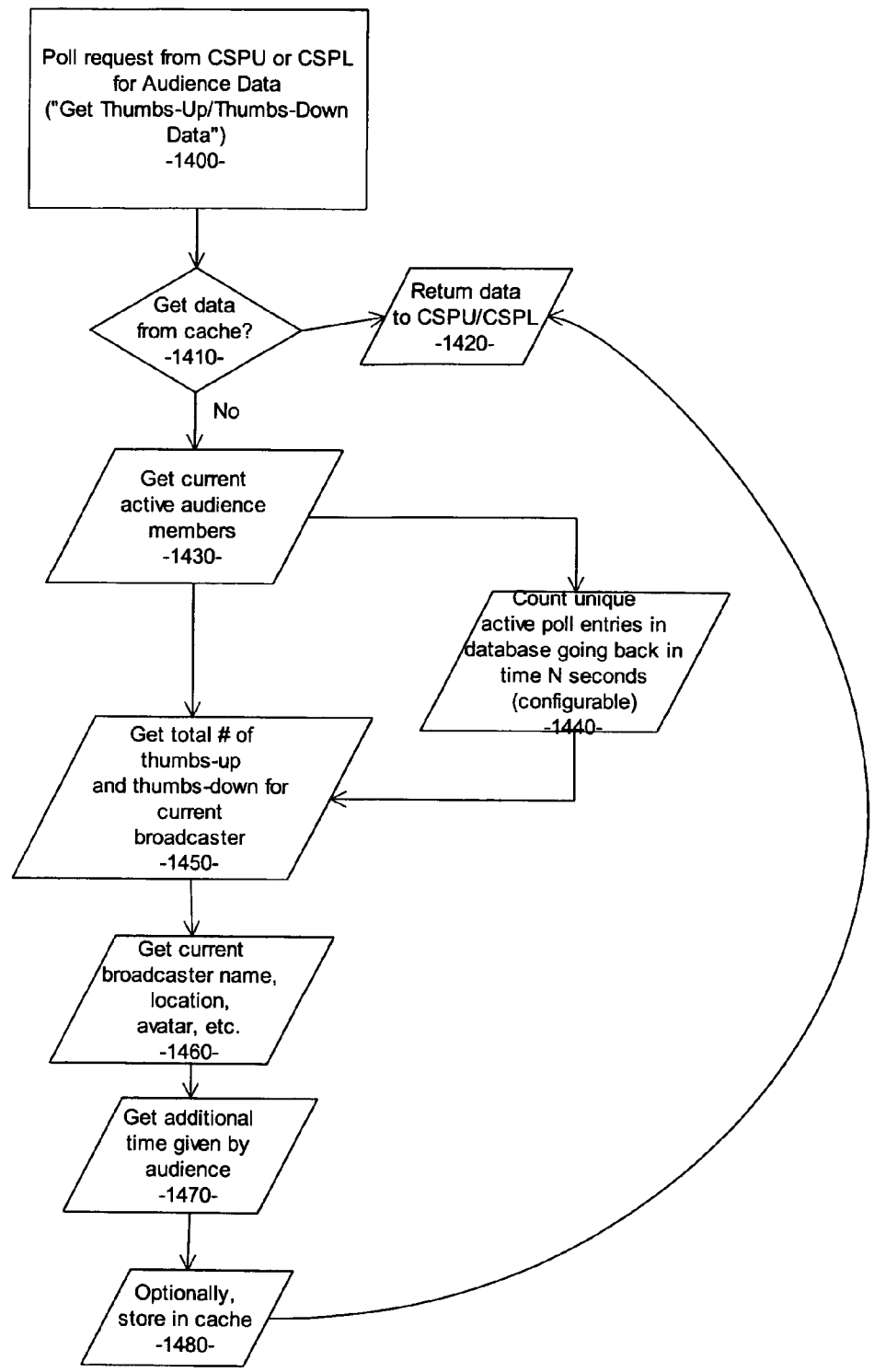
FIG. 14 is a processing flow diagram illustrating the generation of Audience Statistics in an example embodiment.

The number of thumbs-up and thumbs-down for the current broadcaster is retrieved from memory, database, or persistent storage (see processing step 1450 in FIG. 14).

The current broadcaster name, location, and other ancillary data (e.g. photo/avatar) is retrieved for the current broadcaster (see processing step 1460 in FIG. 14).

Additional time, if any had been given/granted, is obtained from the broadcast queue table (see processing step 1470 in FIG. 14).

The results are packaged into a response format for the client (e.g. JSON (Javascript Object Notation), XML, etc.) and optionally stored in the cache before being returned to the client (see processing steps 1480, 1420 in FIG. 14).

Figure 15:
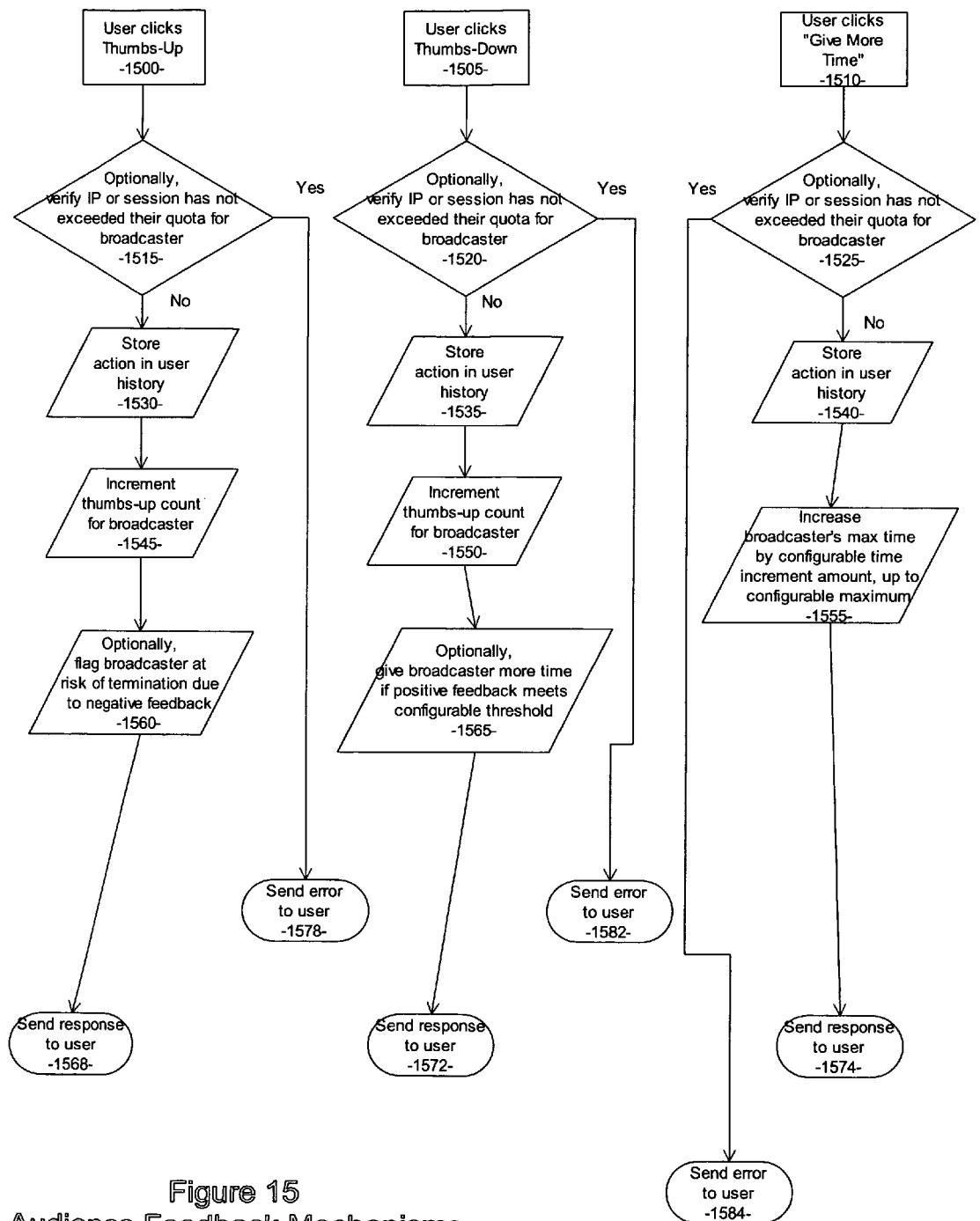
FIG. 15 is a processing flow diagram illustrating Audience Feedback Mechanisms in an example embodiment.

Audience Feedback Mechanisms: Audience members are permitted to give thumbs-up or thumbs-down during a broadcaster's session (see FIG. 15). Optionally, the user's input can be tracked and limited, for example, by only allowing a set number of inputs for each user per a broadcaster's session (see processing steps 1515, 1520 in FIG. 15). Users may also have an option to give the current broadcaster additional time, up to a maximum amount (see processing steps 1510, 1525, 1540, 1555 in FIG. 15). There are a variety of ways to implement this. In one instance, each click on "give more time" by an audience member would give the broadcaster some fixed time increment (e.g., 5 seconds, configurable). In another instance, only if a threshold of users clicking "thumbs-up" is exceeded would the user be given additional time (see processing step 1565 in FIG. 15). There are many variations on this theme, but key to an embodiment of the invention is the ability for additional time to be granted based on some real-time criteria.

The Expiration Manager (EM) is a key element that is used to determine when a given user's session should be terminated, and to subsequently manage the contents of the pending broadcast queue (see FIG. 13).

The EM runs "in the background" (within the SSM) on a continuous basis and examines various real-time data elements to determine if the current broadcasting user should be terminated (see processing step 1300 in FIG. 13), and if so, it manipulates the broadcast queue appropriately. The actual order of the following steps is not relevant—they can be done in an arbitrary order but some optimization can be realized with the described procedure.

The duration of time the current broadcaster has been broadcasting is examined. This is calculated by comparing the start time of the broadcasting session to the current time (see processing step 1315 in FIG. 13). The start time of the session is recorded in the following way.

When the CSPU determines that the active broadcaster name/ID matches the CSPU name/ID (more generically, when the CSPU determines or is told by the SSM that it is the active broadcaster using aforementioned methods), then the first time this occurs it issues a "start broadcasting" request to the SSM. The SSM records in the database the server-time when this command occurs for the current broadcaster. In addition, the CSPU may also send a "insert meta data" command to the MS to tell the MS to record the username/id of the current broadcaster and tag the relevant location in the recorded stream file, if recording is being used and publisher mediation is implemented (see "Recording/Archiving of Broadcasts").

Figure 13:
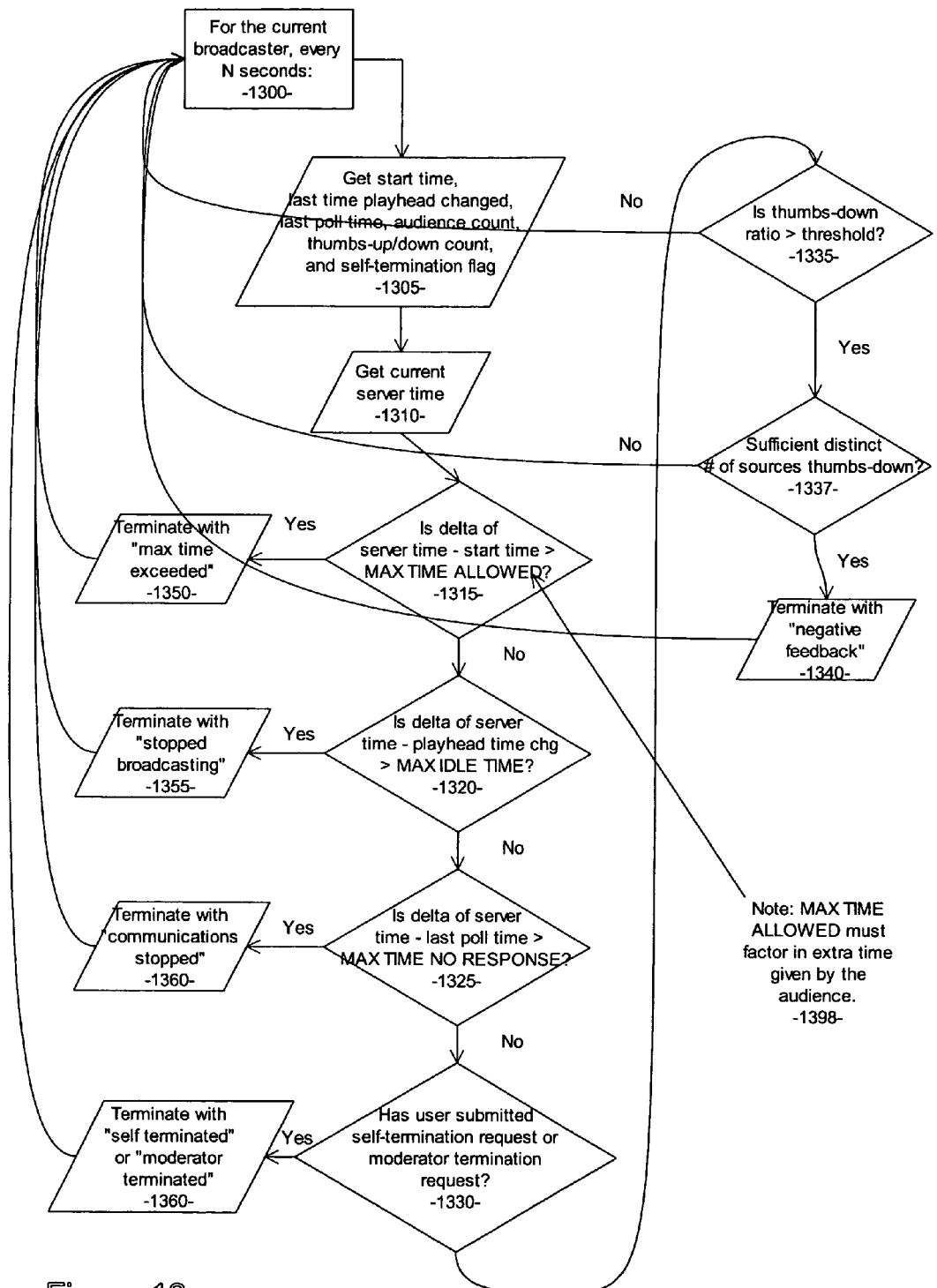
FIG. 13 is a processing flow diagram illustrating the operation of the Expiration Manager in an example embodiment.

When the EM compares the start time to the current server time, it can determine the total time the current session has been broadcasting (processing step 1315 in FIG. 13). It then checks to see if additional time has been added to the broadcaster's session and adds this (perhaps up to a maximum value) to the maximum time allowed for the current session (see processing note 1398 in FIG. 13). If the current session has exceeded the maximum value, the current active session is terminated, with a reason code of "maximum time exceeded." The details of session termination are described below.

Another check to see if the current session should be terminated is a function of the user stopping the broadcast process (browser termination, computer shuts down, network fails, etc.). As noted earlier, each time the CSPU polls the SSM, the current position of the playhead is recorded, along with the server time at which the value has changed compared to the last time it was supplied (see processing step 1320 in FIG. 13). Hence, the EM compares the current server time to the last time the playhead changed. If the delta is greater than a configurable threshold, the session is terminated with reason code "stopped broadcasting." The details of session termination are described below.

Yet another check to see if the current session should be terminated is a function of the last time the CSPU has issued a poll request to the SSM (see processing step 1325 in FIG. 13). The EM subtracts the last poll time from the current server time and if the delta is greater than configurable maximum, the session is terminated with reason code "communications stopped." The details of session termination are described below.

Another check which can optionally be performed is determination of excessive "thumbs-down" feedback to the broadcaster. The EM periodically checks the ratio of thumbs-up votes to thumbs-down votes and calculates a ratio. If this ratio exceeds a certain configurable threshold (in favor of thumbs-down), the session is terminated with reason code "excessive negative feedback" (see processing steps 1335, 1337, 1340 in FIG. 13). The details of session termination are described below. Note that many variations of this feature can be implemented. For example, the check for thumbs-down ratio might occur only after the user has been broadcasting for a minimum period of time. Another variant is only checking the ratio if a certain number of distinct audience members have thumbs-down the broadcaster (to prevent a single user from dominating the effect). These variations can also be combined.

Another check which can be optionally performed by the EM is detection that the broadcaster requested to terminate their session (see processing step 1360 in FIG. 13). The CSPU can have an option for the broadcaster that allows them to terminate their own broadcast. If this occurs, the request from the CSPU would go to the EM so the EM would terminate the user's session with reason code "user self-terminated."

Moderation: a capability is provided for the implementation of a "moderator." The purpose of a moderator is to monitor broadcasts to ensure offensive, illegal, copyright-violating, or other unwanted content is not disseminated. The moderator is identified to the system through standard authentication mechanisms (e.g. username/password, IP address, email address, etc.). Once signed-in to the system, the moderator has additional capabilities not normally available to the CSPU/CSPL. Specifically, the moderator has an option to terminate the current broadcaster, and as well, to terminate future broadcasts from the IP address or email address. Termination is accomplished by a request from the moderator's CSPL to the Expiration Manager to terminate the current session immediately (see processing step 1330 in FIG. 13). The EM terminates the session with the code "moderation terminated" and logs the moderator's request with the offending broadcaster's IP address and email address (to be compared in the future).

Session Termination: When the current broadcaster's session is terminated for any of the above reasons (or for any reason) the EM implements the following steps (see FIG. 16). First, the database record in the queue that represents the current broadcaster is retrieved and its contents copied to temporary storage (see processing step 1600 in FIG. 16). Then, this information is stored in archive table so that historical session analysis can be performed at a later date (see processing step 1610 in FIG. 16). Note that it is common to store this information in a database table but it could be stored in any form of persistent storage. Data stored includes things such data as username/ID, broadcast duration, termination code, thumbs-up/thumbs-down data, IP address, session ID, user agent, etc.

Figure 16:
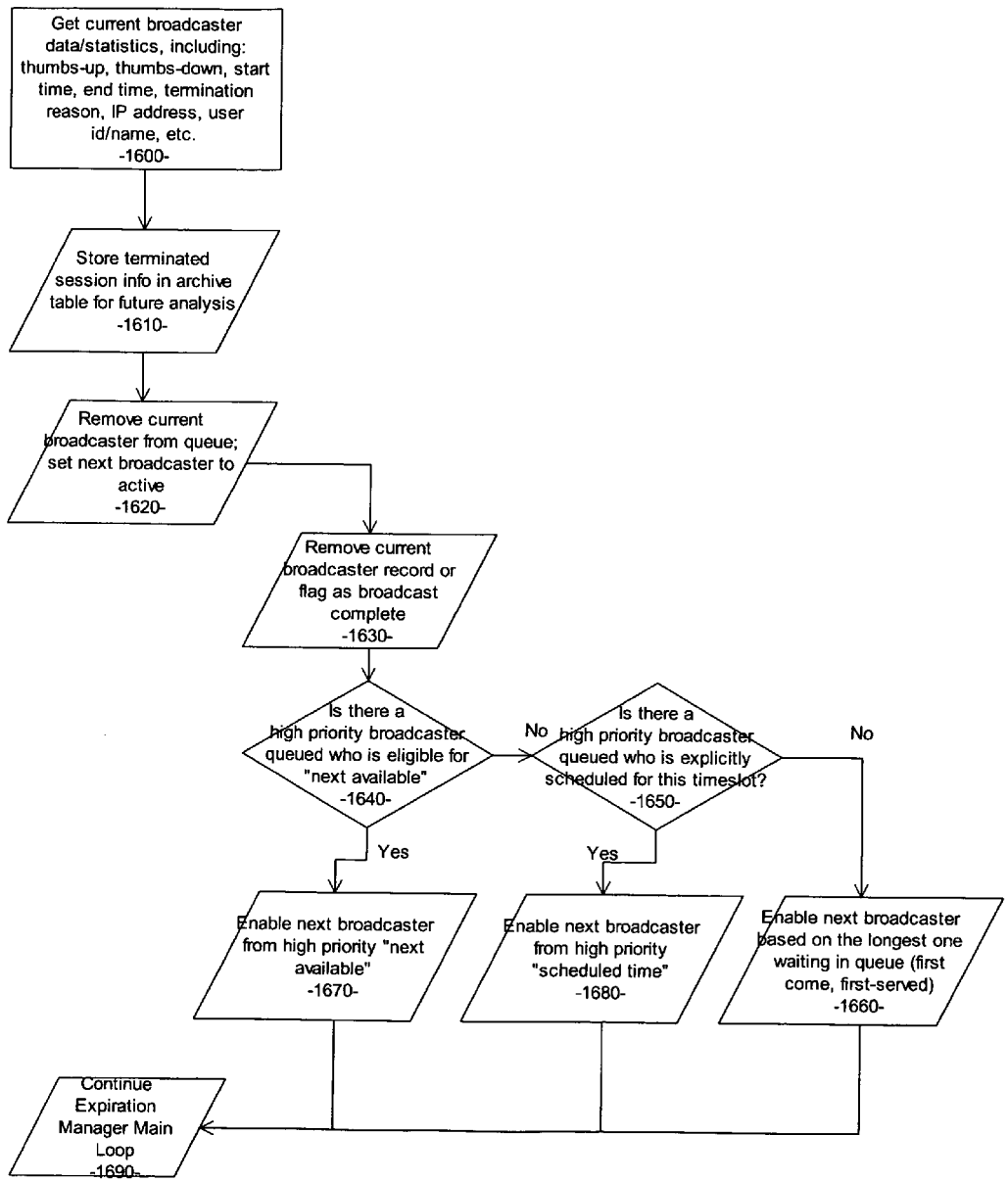
FIG. 16 is a processing flow diagram illustrating Session Termination in an example embodiment.

Then, the record is removed from the queue, making the next available broadcaster active (see processing steps 1620, 1630, 1640, 1650, 1670, 1680, 1690 in FIG. 16). The current broadcaster's record can actually be removed from the queue (table) or just flagged as "completed" (see processing step 1630 in FIG. 16). After the record is removed, the next broadcaster must be calculated. First, if there are any "high priority" users who have been assigned the "next available" timeslot, they must be made the next active broadcaster (processing step 1670 in FIG. 16). If there is more than one user who fits this category, a first-come, first-served algorithm is used amongst the eligible group. If there are no high priority "next available" pending broadcasters, an analysis is done to see if any pending broadcasters are in the queue who have high priority and who have specifically been granted access to a specific time slot. If so, they are made the next active broadcaster (see processing step 1680 in FIG. 16). Again, multiple users in this category are handled in a first-come, first-served basis. Finally, if there are no high priority broadcasters, the next broadcaster made active is based on the earliest time in the queue (longest waiting period). Note that in the description above, high priority "next available" requestors were put in a higher priority category than high priority "time slot" requestors, but this could be reversed depending on the implementation.

By virtue of the record being removed from the queue, the next available broadcaster is now moved in to the active/current broadcaster position. Hence all poll requests from the CSPU and CSPL will now have a new name/ID as the active broadcaster. The CSPL can show the appropriate data retrieved (username, photo/avatar, location, etc.) and the CSPU that corresponds to the new active broadcaster detects it is active and begins publishing to the appropriate rendezvous, and makes a request to the SSM to indicate it has started broadcasting. Future poll requests from the CSPU will now include the updated playhead position as described earlier. Thumbs-up/thumbs-down responses from the audience as well as "add more time" requests will now be attributed to the newly active broadcaster (vs. the prior archived broadcaster).

Once a broadcaster's session has completed, they are now eligible to re-signup (as described earlier). The SSM supports the notion of a window of time that must be reserved before the next sign-up can occur. It could be a dynamic parameter as a function of the number of people in the queue. For example, if only one person is waiting, the wait time might be less than if a greater number of people are waiting.

Active Audience Display: The SSM maintains the state of the audience members so that relevant information can be displayed (to other audience members, as well as the current broadcaster) and also for data mining/demographic analysis purposes. As much information about the audience is maintained and includes things such as (but not limited to): IP address, country/region associated with IP address, self-identified location/gender/political preference/hobbies/etc, last response to the current broadcaster (thumbs-up/down), etc. Historical data for each audience is maintained in an archive table for ongoing trend analysis.

The SSM allows the CSPU and CSPL to request audience data in order to convey the notion of a live audience (and their current mood). The CSPU and CSPL display various representations of the data. For example, a summary of the thumbs-up/thumbs-down data can be show in the form of a stereo meter, or a dial meter (or many other graphical representations).

Individual reaction data can be displayed in real-time because the SSM supplies the CSPU and CSPL with the latitude and longitude and last reaction for each audience member. This allows the CSPU/CSPL to display a geographic presentation of the data for each audience member (e.g. a red image for a thumbs-down, a yellow image for a thumbs-up, and placed on a map). The latitude/longitude can be estimated from the audience member's IP address or, instead, from the user-supplied zip/postal code if such data is provided by the audience member.

If no user is actively broadcasting, the SSM supports the implementation of an "idle" video (pre-rendered) clip that is streamed from the MS that tells potential users they can signup to begin broadcasting. Alternatively, the SSM supports the import of other live feeds (e.g. a webcam, or other streaming media services) as "placeholder" feeds until an actual registered user begins broadcasting. Once a "real user" begins broadcasting, the placeholder streams are immediately terminated.

Figure 17:
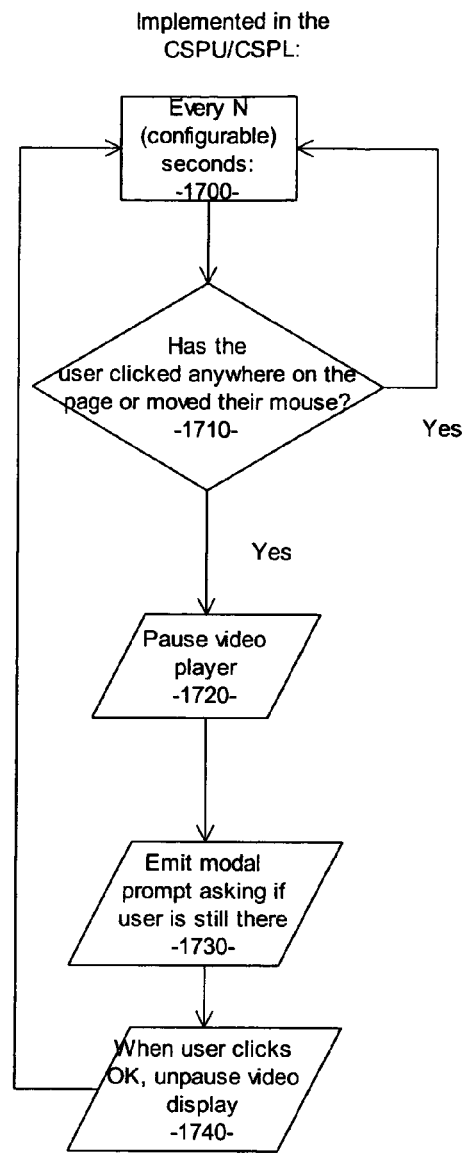
FIG. 17 is a processing flow diagram illustrating the Bandwidth Consumption Check process in an example embodiment.

Bandwidth Consumption Check: To avoid excessive bandwidth use by idle users (e.g. an audience member leaves their computer but continues to stay connected to the MS), the CSPU/CSPL implements a "Are you still there?" prompt that occurs at a customizable interval if the user has not clicked anywhere on the page within the relevant period of time (see FIG. 17). The CSPL/CSPU periodically checks to see if the user has moved their mouse or clicked an on-screen element within a certain period of time. If not, the video playback is paused (see processing step 1720 in FIG. 17) and the prompt is issued (see processing step 1730 in FIG. 17). Once the user acknowledges the prompt, the playback is resumed (see processing step 1740 in FIG. 17) and thereby bandwidth consumption is reduced.

Recording/Archive of Broadcasts: Traditional streaming media servers can be configured to record (to persistent storage) the published stream, if desired. An embodiment of the invention accommodates this capability. The implementation of recording and archiving of published live broadcasts is handled in two different ways, depending on whether Audience Mediation or Publisher Mediation was used.

In the case of Audience Mediation, each live stream is given a unique name to the MS, as part of the Audience Mediation algorithm, and hence each live broadcast will automatically have a unique recorded filename on the MS if the MS is configured to record the streams. An embodiment of the invention implements archiving and referencing such recordings of live streams by keeping database list of unique stream names (used as part of Audience Mediation) which correspond to individual recorded filenames on the MS. Meta information such as date, time, broadcaster id/name are also stored in a database. The actual recorded files can be moved from the MS to persistent archive storage if desired. With the meta information stored in a database, access to historical live streams (recorded) can be provided as desired (such as part of a "pay" feature, indexing based on topics, author, date, time, etc.).

In the event that Publisher Mediation is used, the above archive database maintains the start and stop time of a given broadcaster's stream and this information, along with the above meta information, can be used to index ("seek") to the appropriate point in time of the recorded stream file that contains multiple individual broadcasts. Another variation of this scheme is to use dynamic meta information inserted by the CSPU during the broadcast. Specifically, many streaming media server implementations allow the publisher (client) to send meta information (arbitrary binary or text content) during the publishing process, that is later used to manage the archive or tag various places of the live recorded stream. The CSPU can send a meta information command including the userid/name (along with other meta information) each time the stream starts, so that archive analysis software can detect when individual streams start/end.

Figure 19:
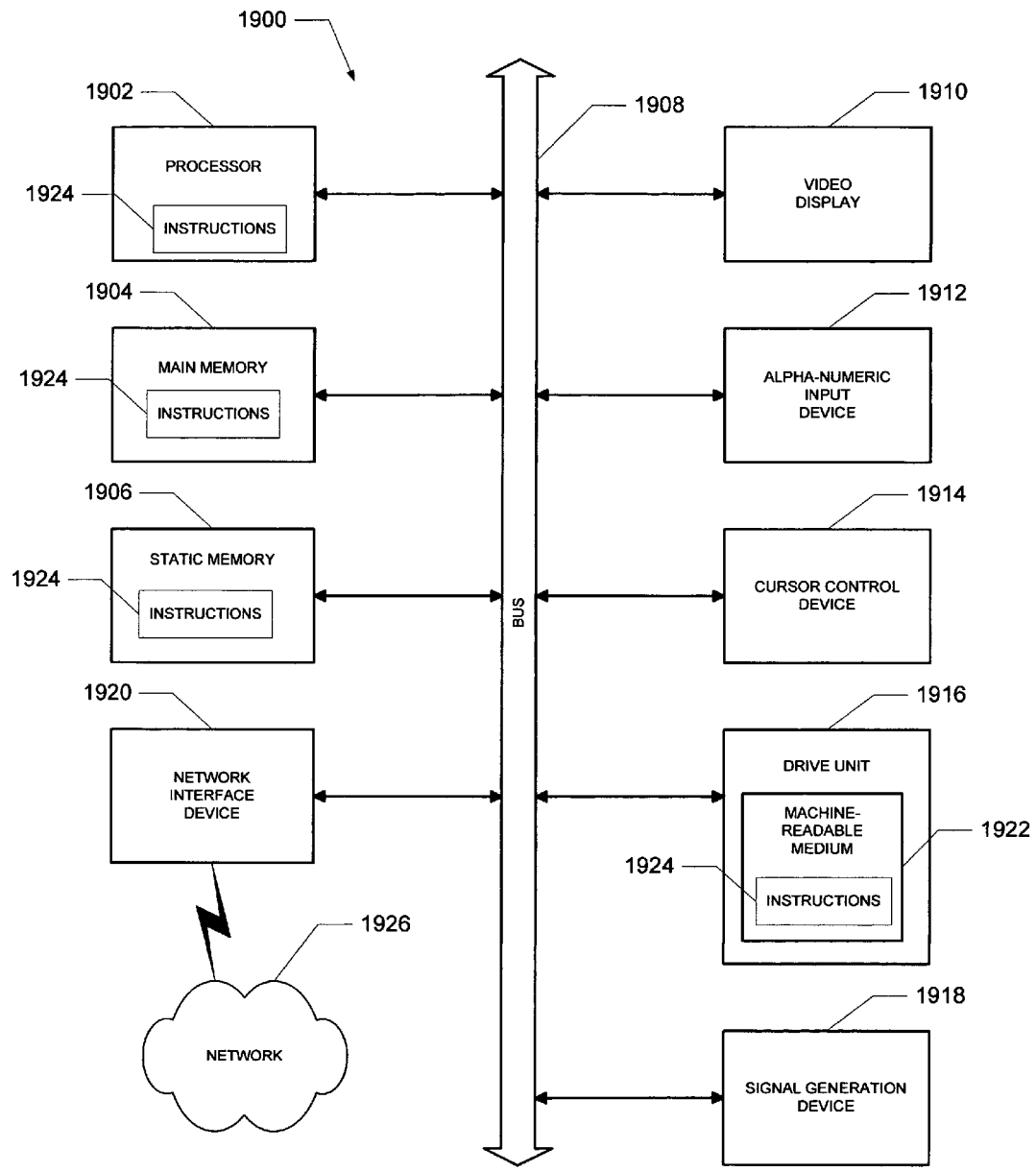
FIG. 19 illustrates a diagrammatic representation of machine in the example form of a computer system within which a set of instructions when executed may cause the machine to perform any one or more of the methodologies discussed herein.

FIG. 19 illustrates a diagrammatic representation of machine in the example form of a computer system 1900 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 1900 includes a processor 1902 (e.g., a central processing unit (CPU), a graphics processing unit (GPU), or both), a main memory 1904 and a static memory 1906, which communicate with each other via a bus 1908. The computer system 1900 may further include a video display unit 1910 (e.g., a liquid crystal display (LCD) or a cathode ray tube (CRT)). The computer system 1900 also includes an input device 1912 (e.g., a keyboard), a cursor control device 1914 (e.g., a mouse), a disk drive unit 1916, a signal generation device 1918 (e.g., a speaker) and a network interface device 1920.

The disk drive unit 1916 includes a machine-readable medium 1922 on which is stored one or more sets of instructions (e.g., software 1924) embodying any one or more of the methodologies or functions described herein. The instructions 1924 may also reside, completely or at least partially, within the main memory 1904, the static memory 1906, and/or within the processor 1902 during execution thereof by the computer system 1900. The main memory 1904 and the processor 1902 also may constitute machine-readable media. The instructions 1924 may further be transmitted or received over a network 1926 via the network interface device 1920. While the machine-readable medium 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method comprising:
   receiving requests from a plurality of broadcasters requesting to broadcast on a shared channel of a public data network, the broadcasters representing continuous streaming media feeds of either live or pre-rendered content;
   queuing and prioritizing the broadcaster-originated requests in a broadcast queue that controls a singular viewing order of content to a multitude of simultaneous viewers representing an audience to enable each of the plurality of broadcasters to broadcast on the shared channel at a different time slot based on dynamic queue positioning performed in real-time, the dynamic queue positioning including first-come, first-served positioning, and front of the queue positioning based on specific priority factors, including broadcaster privilege or specified broadcast timing;
   broadcasting content corresponding to a request of a first broadcaster on the shared channel;
   discontinuing the broadcast of the content of the first broadcaster based on multiple factors;
   broadcasting content corresponding to a request of the second broadcaster on the shared channel; and
   using a coordinated real-time rendezvous to enable the audience of the shared channel to automatically transition from receiving the broadcast of the content of the first broadcaster to receiving the broadcast of the content of the second broadcaster on the shared channel over the public data network.

2. The method as claimed in claim 1 including:
   gathering near real-time audience feedback as related to the content broadcast by the first broadcaster.

3. The method as claimed in claim 2 wherein the near real-time audience feedback is included as at least one factor in the multiple factors used to discontinue the broadcast of the content of the first broadcaster.

4. The method as claimed in claim 1 including:
   providing the plurality of broadcasters with information related to broadcast time slot availability on the shared channel.

5. The method as claimed in claim 1 including:
   allowing a request from one of the plurality of broadcasters to enter the broadcast queue as a pending request.

6. The method as claimed in claim 1 including:
   changing status information corresponding to the first broadcaster to an inactive status when the broadcast of the content of the first broadcaster is discontinued.

7. The method as claimed in claim 1 including:
   changing status information corresponding to the second broadcaster to an active status when the broadcast of the content of the second broadcaster is initiated.

8. The method as claimed in claim 1 wherein the public data network is the Internet.

9. The method as claimed in claim 1 wherein the coordinated real-time rendezvous uses audience mediation.

10. The method as claimed in claim 1 wherein the coordinated real-time rendezvous uses publisher mediation.

11. A system comprising:
    a processor;
    a database, in data communication with the processor, for storage of broadcast related information;
    a media server, in data communication with the processor, for broadcasting content; and
    a server-side monitor, executable by the processor, to receive requests from a plurality of broadcasters requesting to broadcast on a shared channel of a public data network, the broadcasters representing continuous streaming media feeds of either live or pre-rendered content; to queue and prioritize the broadcaster-originated requests in a broadcast queue that controls a singular viewing order of content to a multitude of simultaneous viewers representing an audience to enable each of the plurality of broadcasters to broadcast on the shared channel at a different time slot based on dynamic queue positioning performed in real-time, the dynamic queue positioning including first-come, first-served positioning, and front of the queue positioning based on specific priority factors, including broadcaster privilege or specified broadcast timing; to direct the media server to broadcast content corresponding to a request of a first broadcaster on the shared channel; to direct the media server to discontinue the broadcast of the content of the first broadcaster based on multiple factors; to direct the media server to broadcast content corresponding to a request of the second broadcaster on the shared channel; and to use a coordinated real-time rendezvous to enable the audience of the shared channel to automatically transition from receiving the broadcast of the content of the first broadcaster to receiving the broadcast of the content of the second broadcaster on the shared channel over the public data network.

12. The system as claimed in claim 11 wherein the server-side monitor being further configured to gather near real-time audience feedback as related to the content broadcast by the first broadcaster.

13. The system as claimed in claim 12 wherein the near real-time audience feedback is included as at least one factor in the multiple factors used to discontinue the broadcast of the content of the first broadcaster.

14. The system as claimed in claim 11 wherein the server-side monitor being further configured to provide the plurality of broadcasters with information related to broadcast time slot availability on the shared channel.

15. The system as claimed in claim 11 wherein the public data network is the Internet.

16. The system as claimed in claim 11 wherein the coordinated real-time rendezvous uses audience mediation.

17. The system as claimed in claim 11 wherein the coordinated real-time rendezvous uses publisher mediation.

18. A non-transitory machine-useable storage medium embodying instructions which, when executed by a machine, cause the machine to:
    receive requests from a plurality of broadcasters requesting to broadcast on a shared channel of a public data network, the broadcasters representing continuous streaming media feeds of either live or pre-rendered content;

queue and prioritize the broadcaster-originated requests in a broadcast queue that controls a singular viewing order of content to a multitude of simultaneous viewers representing an audience to enable each of the plurality of broadcasters to broadcast on the shared channel at a different time slot based on dynamic queue positioning performed in real-time, the dynamic queue positioning including first-come, first-served, positioning, and front of the queue positioning based on specific priority factors, including broadcaster privilege or specified broadcast timing;

direct a media server to broadcast content corresponding to a request of a first broadcaster On the shared channel;

direct the media server to discontinue the broadcast of the content of the first broadcaster based on multiple factors;

direct the media server to broadcast content corresponding to a request of the second broadcaster on the shared channel; and use a coordinated real-time rendezvous to enable the audience of the shared channel to automatically transition from receiving the broadcast of the content of the first broadcaster to receiving the broadcast of the content of the second broadcaster on the shared channel over the public data network.

19. The machine-useable storage medium as claimed in claim 18 wherein the instructions being further configured to gather near real-time audience feedback as related to the content broadcast by the first broadcaster.

20. The machine-useable storage medium as claimed in claim 19 wherein the near real-time audience feedback is included as at least one factor in the multiple factors used to discontinue the broadcast of the content of the first broadcaster.

21. The method of claim 1 including notifying a second broadcaster corresponding to a next one of a plurality of pending requests in the broadcast queue that the second broadcaster's opportunity for broadcast on the shared channel is imminent.

22. The system of claim 11 wherein the server-side monitor being further configured to notify a second broadcaster corresponding to a next one of a plurality of pending requests in the broadcast queue that the second broadcaster's opportunity for broadcast on the shared channel is imminent.

23. The machine-useable storage medium of claim 18 being further configured to notify a second broadcaster corresponding to a next one of a plurality of pending requests in the broadcast queue that the second broadcaster's opportunity for broadcast on the shared channel is imminent.

* * * * *